United States Patent [19]  [11] 4,328,397
Chamberlin  [45] May 4, 1982

[54] METHOD AND APPARATUS FOR CONTROLLING PREDETERMINED MACHINE CONDITIONS, SUCH AS THE OPERATING CONDITIONS OF A DICTATION/TRANSCRIPTION MACHINE

[75] Inventor: David B. Chamberlin, Milford, Conn.
[73] Assignee: Dictaphone Corporation, Rye, N.Y.
[21] Appl. No.: 178,106
[22] Filed: Aug. 14, 1980
[51] Int. Cl.³ .................. H04M 1/65; H04M 11/10
[52] U.S. Cl. .................................. 179/6.09; 369/25
[58] Field of Search ............... 179/6.03, 6.09; 369/25, 369/27, 28, 32, 53, 58; 360/72.1, 72.2, 69, 137, 72.3

[56] References Cited

U.S. PATENT DOCUMENTS

| | | | |
|---|---|---|---|
| 2,984,710 | 5/1961 | Trost | 369/25 X |
| 3,555,202 | 1/1971 | Warnke | 369/25 |
| 3,564,152 | 2/1971 | Kurz | 369/25 |
| 3,636,271 | 1/1972 | Rodenbeck | 369/25 |
| 3,895,189 | 7/1975 | Matz | 179/6.09 |
| 3,956,740 | 5/1976 | Jones et al. | 360/72.2 |
| 4,200,893 | 4/1980 | Matison | 360/72.1 |
| 4,210,785 | 7/1980 | Huber et al. | 360/72.2 |
| 4,224,644 | 9/1980 | Lewis et al. | 360/72.2 |
| 4,260,854 | 4/1981 | Kolodny et al. | 179/6.09 |

Primary Examiner—James W. Moffitt
Assistant Examiner—Donald McElheny, Jr.
Attorney, Agent, or Firm—Curtis, Morris & Safford

[57] ABSTRACT

A machine, such as a dictation/transcription machine, is provided with a processor that is programmed to cycle through a set of instructions for selecting and controlling predetermined operating conditions. The actuation of one of a number of selector switches is sensed, and it is determined whether the machine exhibits the operating condition associated with the actuated switch. If so, that condition is terminated; but if not, the machine is disposed in the associated condition. If the aforementioned switch is not actuated, the actuation of a second switch associated with the same condition is sensed. If that second switch is actuated, the machine is disposed in the associated condition; and when that second switch subsequently is deactuated, the associated condition is terminated. These steps are cyclically repeated. In one embodiment, the aforementioned operating condition is a power ON condition, and the first switch is a manually operable power switch, such as a push button switch, and the second switch may be either a cradle switch or an accessory power switch. In accordance with another embodiment, the operating condition is a telephone mode of operation, whereby voice signals are received via the telephone network and recorded by the dictation/transcription machine. If the machine is not then disposed in its telephone mode, the actuation of a telephone switch establishes this mode, while overriding other operating conditions that may have been present. The status of such overridden conditions are stored and reinstated when the telephone switch is reactuated to terminate the telephone mode of operation.

30 Claims, 8 Drawing Figures

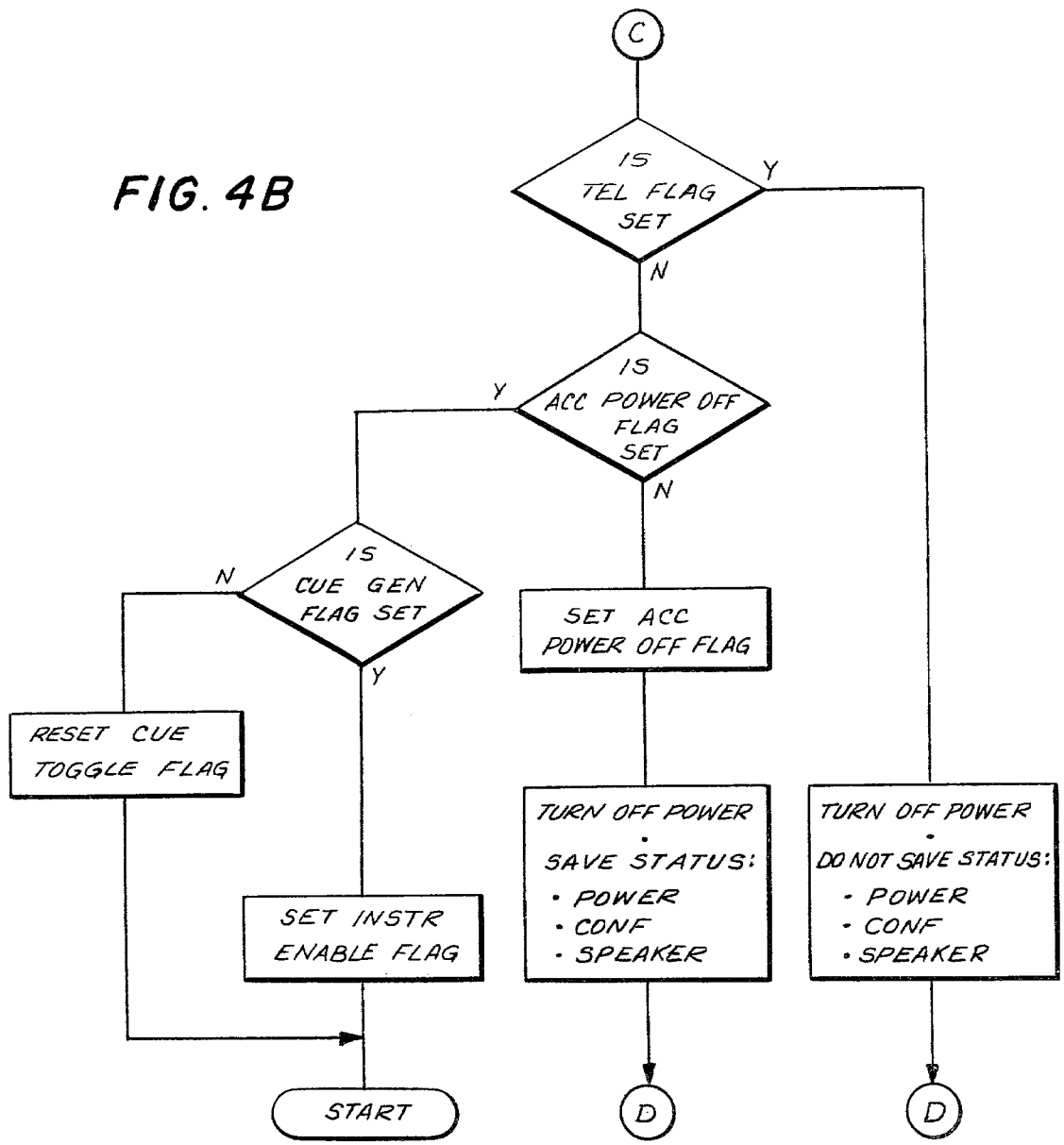

4,328,397

METHOD AND APPARATUS FOR CONTROLLING PREDETERMINED MACHINE CONDITIONS, SUCH AS THE OPERATING CONDITIONS OF A DICTATION/TRANSCRIPTION MACHINE

BACKGROUND OF THE INVENTION

This invention relates to a method and apparatus for controlling predetermined operating conditions of a machine and, more particularly, to the use of a programmed processor, such as a microprocessor, to control the operating conditions of a dictation/transcription machine in response to the actuation of selected switches.

In recording/reproducing devices, such as dictation/transcription machines, which are commercially available, various operating modes and conditions are selected by the manual operation of particular selector switches. Depending upon which switch is actuated, a corresponding condition is established. When that same switch is deactuated, the condition is terminated. The control over such modes of operation, such as the priority by which certain modes are established, heretofore has been effected by way of so-called "ladder" networks, discrete control circuits, and the like.

The use of "hardware" implementation to control machine operations, that is, the use of the aforementioned ladder networks and discrete control circuitry, may be expensive to construct and assemble and, moreover, may be subjected to an unsatisfactorily high proportion of malfunction. The present invention substitutes a single microprocessor for multiple control circuits and switching devices which have been relied upon heretofore. Not only does the use of such a microprocessor improve reliability and lower the overall cost of the dictation/transcription machine, but the well-known capabilities and flexibility of microprocessors are turned to account in that additional, advantageous features may be provided. For example, control over the power supply to the dictation/transcription machine may be obtained, regardless of whether a simple power switch is operated, or whether an accessory power switch is operated, or whether a cradle switch is operated, or whether an electronic power control signal is produced. The interaction of such switches and signals is controlled by the microprocessor to effect a suitable supply or termination of power. As another example, this same microprocessor is used to establish a particular mode of operation, such as a telephone mode, whereby dictated information that is received from a telephone network is recorded on the record medium by the dictation/transcription machine. Various ancillary conditions which are necessary for carrying out such an operation are controlled by the microprocessor, even when only a single selector switch is operated.

OBJECTS OF THE INVENTION

Therefore, it is an object of the present invention to provide an improved method and apparatus for controlling various machine operating conditions by a programmed processor.

Another object of this invention is to provide a single microprocessor which is programmed to cycle through a set of instructions, and, while proceeding with its program, serves to control various operating conditions of, for example, a dictation/transcription machine.

A further object of this invention is to provide an improved method and apparatus for controlling the supply of power to a dictation/transcription machine in response to various switching devices, any of which may be actuated independently of the others.

An additional object of this invention is to provide an improved method and apparatus for establishing a predetermined condition, such as a telephone mode of operation, for a dictation/transcription machine in response to the actuation of an associated selector switch, regardless of the states of various other machine conditions which then may be present.

Yet another object of this invention is to provide a single microprocessor which functions to establish predetermined operating conditions of a dictation/transcription machine in response to the actuation of selected ones of selector switches which are provided on or with that machine.

Various other objects, advantages and features of the present invention will become readily apparent from the ensuing detailed description, and the novel features will be particularly pointed out in connection with the appended claims.

SUMMARY OF THE INVENTION

In accordance with this invention, a method and apparatus are provided for controlling various operating conditions of a machine, such as a dictation/transcription machine, by a processor which is programmed to cycle through a set of instructions. In accordance with one aspect of this invention, power is selectively supplied and terminated in response to the operation of a power switch or at least one other switch. The processor functions to sense if the power switch is actuated and, if so, to sense whether power then is being supplied to the machine. If so, this power is terminated; but if not, power is supplied. If the power switch is not actuated, the processor senses if another switch is actuated, and if so, a power ON condition is established. The subsequent deactuation of this lastmentioned switch is sensed to terminated the power ON condition. These steps are cyclically repeated.

In accordance with another aspect of this invention, the dictation/transcription machine is capable of being operated in a telephone mode, in response to the actuation of a suitable telephone switch, to receive information which is dictated via a telephone network and to record that information on a suitable record medium. The processor serves to sense if the telephone switch is actuated and, if so, and if the machine is not then disposed in its telephone mode of operation, to establish that mode. The status of various other machine conditions which may have been present at the time the telephone mode was established are stored. If the machine already had been disposed in its telephone mode, the sensed actuation of the telephone switch serves to terminate this mode and to restore those conditions whose status had been stored.

BRIEF DESCRIPTION OF THE DRAWINGS

The following detailed description, given by way of example, will best be understood in conjunction with the accompanying drawings in which:

FIGS. 4A and 4B are flow charts illustrating the manner in which the microprocessor controls the power supply to the dictation/transcription machine, in accordance with another aspect of the present invention;

DETAILED DESCRIPTION OF CERTAIN PREFERRED EMBODIMENTS

Figure 1:
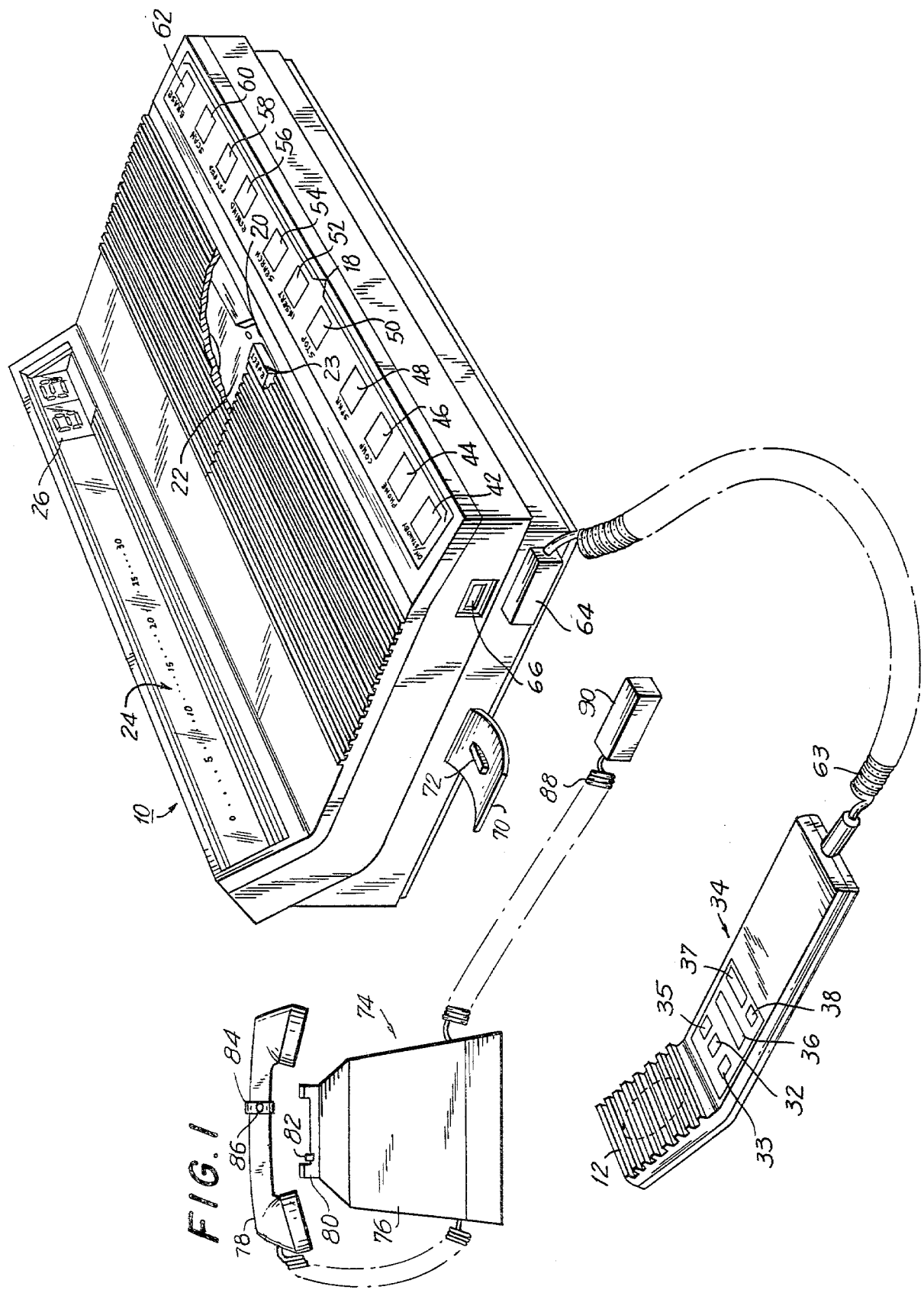
FIG. 1 is an overall view of one type of dictation/transcription machine with which the present invention can be used.

Referring now to the drawings, and in particular to FIG. 1, there is illustrated a representation of a dictation/transcription machine 10 with which the present invention finds ready application. Although this invention can be used with other machines and devices, for a clear understanding thereof, it will be described in the environment of a dictation/transcription machine. This machine includes magnetic transducers, or heads, which are selectively controlled to operate as recording transducers for the recording of audio signals onto a magnetic record medium, such as magnetic tape, and also to reproduce such information. Suitable audio amplifiers, filters and other circuits are provided for the recording and reproduction of such signals. Also included in machine 10 is a so-called slow motor which is selectively energized to transport the magnetic tape at a normal speed at which the audio signals are recorded on and reproduced from that magnetic tape, and a so-called fast motor which is selectively energized to transport the magnetic tape at a relatively high speed in either the forward or reverse directions. A transmission (not shown) is provided such that the single fast speed motor imparts rotary motion in the forward or reverse directions in accordance with the selective actuation of a fast-forward or rewind selector, to be described. Record, playback, fast-forward and rewind operations are conventional and well known to those of ordinary skill in the art. Preferably, the magnetic tape upon which the audio signals are recorded is contained within a tape cassette 22 disposed within a suitable cassette compartment 20 of machine 10. An EJECT button 23 is provided to expose cassette compartment 20 so as to load cassette 22 therein or to remove the cassette therefrom.

Machine 10 is electrically connected, at a suitable connection jack thereof, to a hand-held microphone unit 12, whereby voice signals are supplied to the recording circuit of the machine from the microphone unit. The microphone unit also is provided with a loudspeaker such that signals which are reproduced from the magnetic tape are transduced selectively either by the loudspeaker integrally provided in machine 10 or by the loudspeaker integrally provided with microphone unit 12. As will be described, a suitable speaker control switch is provided on machine 10 to select either the machine speaker or the microphone speaker for transducing of the reproduced signals.

Microphone unit 12 also is provided with various control switches 34 which are manually operable to select various operating modes for machine 10. These control switches include a record-lock switch 32 which, when operated, selects and latches a recording mode for machine 10. In this mode of operation, the magnetic tape included within cassette 22 is driven at its normal speed, and the recording circuit is energized so as to record audio signals on the magnetic tape. These audio signals are, of course, produced by the microphone pick-up (not shown) which is provided in unit 12. This unit also includes a cue signal recording switch 33 which, when operated, initiates a cue signal generating-/recording mode whereby a cue signal is recorded on the magnetic tape. Preferably, this cue signal is recorded in the very same track in which the audio signals are recorded. As is described more fully in copending application Ser. No. 178,357, filed Aug. 15, 1980, if cue signal recording switch 33 is actuated once, a single burst of cue signal is recorded for a predetermined time duration. This cue signal is an oscillating signal of predetermined frequency and is sometimes referred to herein as a cue tone. In one embodiment, the frequency of this cue tone is 15 Hz. If cue signal recording switch 33 is released and then re-actuated within a predetermined time period, then two successive bursts of cue tone are recorded, these two bursts being separated by a predetermined interval. Preferably, the single burst of cue tone is used as a letter cue signal, representing the end/beginning of a letter, message, or the like. The two bursts of cue tone represent an instruction cue signal and may be used to indicate the location of particular instructions which are recorded by the user of machine 10. If desired, cue signal recording switch 33 may be replaced by separate, individual letter and instruction switches. Actuation of the letter switch results in the recording of a single burst of cue tone; and actuation of the instruction switch results in the recording of two bursts of cue tone.

Microphone unit 12 also is provided with a fast-forward switch 35. When this fast-forward switch is actuated, the fast-forward mode of operation is selected for machine 10. It is appreciated that, in the fast-forward mode, the magnetic tape is transported in the forward direction at a relatively high speed. In this fast-forward mode, as selected by the actuation of fast-forward switch 35 on microphone 12, if a cue signal had been recorded on the magnetic tape, this cue signal is detected and a suitable indication is provided to the user. Thus, actuation of fast-forward switch 35 allows the user to access rapidly particular information on the magnetic tape, the location of which is indicated by a previously recorded cue signal.

Microphone unit 12 also is provided with a record switch 36 which, when actuated, disposes machine 10 in the recording mode of operation. Record switch 36 is similar to record lock switch 32, except that the actuation of the record switch maintains the recording mode of operation only for so long as this switch remains actuated. As mentioned above, the actuation of record lock switch 32 latches the machine in the recording mode until, for example, stop switch 38 is operated.

Stop switch 38, in addition to releasing machine 10 from the record mode which had been selected by the actuation of record-lock switch 32, also releases the machine from the play mode. This latter mode is selected by the actuation of rewind/play switch 37. When this switch is actuated, the aforementioned fast motor is energized so as to rewind the magnetic tape at its relatively high speed. Upon the release of rewind/play switch 37, the fast motor is de-energized, and the slow motor is energized so as to drive the magnetic tape in the forward direction at its normal speed; and also, the reproducing circuit included within machine 10 is conditioned so as to reproduce audio signals from the magnetic tape. As mentioned above, these audio signals are transduced by the speaker integrally provided within machine 10 or by the speaker integrally provided in microphone unit 12.

Preferably, control switches 34 are spring-actuated, except that record-lock switch 32 may be a releasable-locking switch. When any of the control switches is actuated, or "pushed", a suitable signal, preferably an encoded signal, is produced to identify the particular switch which has been actuated and thus to represent the particular operating mode which has been selected. If the control switches are of the spring-loaded push-button type, then the release of the actuated switch terminates this identifying signal. An encoder may be provided in microphone unit 12 so as to produce a 3-bit digital signal identifying the particular control switch which has been actuated. This 3-bit signal is communicated to a connector plug 64 by a multi-wire cable 63.

Although not shown in FIG. 1, the jack, or connector, into which plug 64 is inserted also is adapted to receive a plug which is electrically coupled to a foot-pedal switch arrangement, whereby a transcriptionist may establish selective operating modes for machine 10 in order to transcribe information which has been dictated onto the magnetic tape. For example, the foot-pedal switch arrangement may produce 3-bit signals identifying the actuation of a play switch, a fast-forward switch, a rewind switch and the like. In addition, a particular electrical connecting pin on the connector to which plug 64 is inserted may be adapted to be selectively short-circuited when microphone unit 12 is connected thereto and may be open-circuited when the foot-pedal switch arrangement is connected, thereby applying a predetermined signal level at this pin to identify whether a microphone unit or a foot-pedal switch arrangement is connected to machine 10. It will be appreciated that this particular signal facilitates the interpretation of the 3-bit signal which is supplied to the connector either in response to the actuation of control switches 34 of microphone unit 12 or in response to the selected actuation of the foot-pedal switch arrangement.

Still further, and as will be described below, the connector of machine 10 is adapted to receive a connector plug, such as plug 90, of an accessory device which is operable to control the operating mode of the machine. For example, this accessory device may be a telephone-type unit 74 having a base 76 and a handset 78 for transmitting dictated information to the machine. A cradle 80 is adapted to receive and support handset 78 during inactive periods of non-use of unit 74. A so-called hook switch 82 is depressed when the handset is received by the cradle, and is released when the user wishes to make use of this accessory unit. Suitable control switches 84 and 86 are provided on handset 78, which also contains a microphone and a speaker, to enable the user to control the operation of machine 10. A multi-wire cable 88 and a connector plug 90 similar to cable 63 and plug 64, serve to connect unit 74 to machine 10. One embodiment of unit 74 is described in U.S. Pat. No. 3,872,263.

Machine 10 also is provided with a connector 66 adapted to receive a head-phone plug so as to supply reproduced audio signals to head-phone transducers which may be connected thereto. A transcriptionist thus is provided with audible signals via such head-phone transducers, in order to transcribe the information which has been recorded.

Still further, machine 10 also is provided with a cradle switch 72 disposed within a cradle structure 70 adapted to receive and support microphone unit 12 when both the machine and microphone unit are not operated. As will be described, cradle switch 72 is used as a power on/off control so as to supply appropriate electrical operating power to machine 10.

Also, a connector (not shown) is provided and is adapted to be coupled to a telephone adapter unit, whereby the machine may communicate via conventional telephone lines with a remote party to record dictation or telephone messages. A suitable telephone adapter is described in copending application Ser. No. 146,779, and is operable to control machine 10 to function as a telephone-answering device or as a remote dictation device. The manner in which the machine is controlled to be disposed in a telephone mode of operation is described below.

Dictation/transcription machine 10 is provided with a plurality of control switches 18, each switch being manually operable to control a particular function or establish an appropriate mode of operation. Typical of such control switches are a POWER switch 42, a TELEPHONE switch 44, a CONFERENCE switch 46, a SPEAKER switch 48, a STOP switch 50, an INSERT switch 52, a SEARCH switch 54, a REWIND switch 56, a FAST FORWARD switch 58, a SCAN switch 60 and an ERASE switch 62. Preferably, each of these switches is formed as a so-called touch-sensitive switch and is adapted to produce a signal representing the actuation thereof when touched by the user of machine 10. Alternatively, these switches may be push-button switches, capable of producing such signals. When the touch-sensitive or push-button switch is released, the signal produced thereby terminates. For purposes of the present discussion, the POWER, TELEPHONE, CONFERENCE and SPEAKER switches are referred to herein as "toggle" switches, and the remaining switches are referred to herein as keyboard switches. As suggested by the expression "toggle", each toggle switch is actuated when touched or pushed, by the user, to establish an associated machine operating condition which remains even if the user removes his finger from the switch. To release or terminate the mode of operation selected thereby, the same switch must be touched or pushed again.

POWER switch 42 is adapted, when actuated, to supply energizing power to dictation/transcription machine 10. When changed over to its "on" condition, POWER switch 42 supplies suitable energization to power, or drive, the normal-speed and fast-speed motors, the recording and reproducing circuitry, and various additional devices (not shown) which might be connected to the dictation/transcription machine. Actuation of POWER switch 42 is detected by a microprocessor and is indicated by the illumination of a suitable indicating lamp which, preferably, is disposed beneath the POWER switch. It should be appreciated that this microprocessor normally is supplied with energizing potential even when POWER switch 42 is in its "off" condition. Hence, a voltage regulating circuit included within dictation/transcription machine 10 may be connected directly to AC mains in order to supply the microprocessor with such energizing potential.

POWER switch 42 cooperates with a so-called accessory power switch, such as hook switch 82 provided in unit 74, and also with cradle switch 72, for supplying energizing power to the dictation/transcription machine. Also, the aforementioned telephone adapter which may be used with dictation/transcription machine 10 may, when operated, such as in response to an incoming telephone call, supply a "power-on" signal to the microprocessor, thus simulating the manual actuation of POWER switch 42. The manner in which operation of the power switch functions to turn power "on" or "off" is described in greater detail hereinbelow.

TELEPHONE switch 44 is adapted, when actuated, to enable dictation/transcription machine 10 to respond to incoming telephone calls. In this mode, the dictation/transcription machine is capable of functioning either as a telephone-answering machine or as a remote dictating machine. In the latter mode of operation, audio information, such as dictation, is transmitted to the machine via telephone lines for recording on the magnetic tape in cassette 22. The manner in which dictation/transcription machine 10 operates in this telephone mode of operation is described in aforementioned copending application Ser. No. 146,779.

In addition, when TELEPHONE switch 44 is actuated, energizing power is supplied to the dictation/transcription machine even if POWER switch 42 had assumed its "off" condition. Also, indicator lamps which, preferably, are provided beneath each of POWER switch 42, TELEPHONE switch 44, CONFERENCE switch 46 and SPEAKER switch 48 are illuminated to indicate that machine 10 has been operated to assume its telephone mode of operation. When TELEPHONE switch 44 is actuated once again, the telephone mode of operation is terminated and, moreover, the previous conditions associated with POWER switch 42, CONFERENCE switch 46 and SPEAKER switch 48 are resumed. That is, dictation/transcription machine 10 assumes the same mode of operation that it had assumed prior to the original actuation of TELEPHONE switch 44. This is described in greater detail below.

CONFERENCE switch 46 is adapted, when actuated, to establish a "conference" mode of recording. In this mode, the amplification of the audio signals which are recorded on the magnetic tape is increased. Thus, audible signals of relatively low level received by microphone unit 12 are amplified substantially so as to be recorded with sufficient gain. Consequently a "conference" among plural individuals who are located at varying distances from microphone unit 12 may be recorded with adequate fidelity. In addition, when CONFERENCE switch 46 is actuated, the lamp disposed beneath the CONFERENCE switch is illuminated so as to provide a suitable indication that the conference mode has been assumed.

SPEAKER switch 48 is adapted, when actuated, to assume a first condition, whereby the loudspeaker included within dictation/transcription unit 10 is enabled, or to assume a second condition, whereby the loudspeaker included within microphone unit 12 is enabled. The enabled loudspeaker serves to transduce the audio signals which are reproduced from the magnetic tape, whereby these audio signals are reproduced as audible information that is readily perceived by the user. In addition, the indicator lamp disposed beneath SPEAKER switch 48 is illuminated when this switch assumes its first condition, and is extinguished when this switch assumes its second condition. If desired, this lamp may be illuminated when SPEAKER switch 48 assumes its second condition and may be extinguished when this switch assumes its first condition. A more detailed description of the manner in which the microprocessor operates in response to the actuation of SPEAKER switch 48 is described below.

The remaining keyboard switches provided with dictation/transcription unit 10 now will be briefly described. STOP switch 50 is manually operable to establish a "stop", or quiescent, mode of operation for the dictation/transcription machine. Typically, switch 50 may be operated to terminate a fast-forward or rewind mode of operation. The microprocessor, when carryong out its programmed routine, detects the operation of the STOP switch so as to establish the "stop" mode.

INSERT switch 52 is adapted, when actuated, to establish an "insert" mode of operation, whereby audio information is recorded, via microphone unit 12, onto a separate channel, or track, of the magnetic tape in cassette 22. As is conventional, the magnetic tape in this cassette is provided with at least two tracks for recording information. Normally, information is recorded on one track while the magnetic tape is driven from its supply reel to its take-up reel. If cassette 22 is turned over, the second track is used to record such audio information. In the "insert" mode, as established by the actuation of INSERT switch 52, normal dictation is recorded on one track and special "insert" information is recorded on the second track. In addition, a superimposed, higher frequency tone signal is recorded on the first track so as to indicate the location along the magnetic tape at which the "insert" information is recorded on the second track.

To carry out the "insert" mode of operation, the recording/playback transducer, or head, preferably is provided with two channels, or gaps, respectively aligned with the two tracks of the magnetic tape. During normal dictation, the audio signals are supplied to the first channel so as to be recorded in the first track. In response to the actuation of INSERT switch 52, the audio signals are supplied to the second channel so as to be recorded in the second track. During a normal playback mode of operation, the audio signals which had been recorded on the first track are reproduced by the first channel of the recording/playback transducer. The inserted information is reproduced from the second track by the second channel of the transducer.

SCAN switch 60, when actuated, serves to rewind the magnetic tape and, during this rewind operation, to enable all letter and instruction indicator signals which have been recorded thereon to be detected. This mode of operation is useful when a transcriptionist prepares to transcribe dictation which has been recorded on the tape. The relative locations along the tape at which such letter and instruction indicator signals are recorded are indicated by an index/instruction display 24. Then, once the tape is satisfactorily rewound, SEARCH switch 54 may be actuated to establish a "search" mode of operation, whereby the tape now is driven in the forward direction at a relatively fast speed. In this "search" mode, whenever an instruction indicator signal is detected, the mode of operation of dictation/transcription machine 10 is changed over to a "play" mode; and instructional information, which may be recorded following the instruction indicator signal, is reproduced. Thus, prior to the actual transcription of the information recorded on the magnetic tape, the transcriptionist is made aware of the instructional information which may have been recorded so as to improve efficiency in the overall transcription.

SCAN switch 60, when operated, produces a scan signal which is detected by the microprocessor. When this scan signal is detected, the microprocessor serves to establish the "scan" mode of operation, described above. Thus, the fast-speed motor is energized to rewind the magnetic tape in cassette 22; and cue signal detecting electronics are enabled to detect letter and instruction indicating signals which may be recorded on the magnetic tape. When a letter indicating signal is detected, an indication thereof is provided on index/instruction display 24. When an instruction indicating signal is detected, a suitable instruction indication is provided on the index/instruction display.

If desired, the user of dictation/transcription machine 10 may record special instruction information in the very same track in which normal dictation is recorded, that is, in the first track. The location of such instructional information is indicated by recording an instruction indicating signal in the manner described hereinabove. That is, the dictator may actuate cue switch 33 on microphone unit 12 twice in succession or, alternatively, may operate an instruction switch. When SEARCH switch 54 is actuated, the magnetic tape in cassette 22 is driven in the forward direction at its fast speed, and cue signal detecting electronics (not shown) are energized to detect instruction indicating signals. Upon detection of such an instruction indicating signal, the mode of operation of dictation/transcription unit 10 is changed over to a normal play mode, whereby the instructional information which is recorded in the first track on the magnetic tape is reproduced. Thus, when SEARCH switch 54 is actuated, the magnetic tape is scanned, or searched, for the location of instruction indicating signals, and then the instructional information which is recorded following such instruction indicating signals is reproduced.

REWIND switch 56 is adapted, when operated, to produce a rewind actuating signal which is supplied to the microprocessor. This rewind actuating signal is detected and used to establish a "rewind" mode, whereby a rewind circuit (not shown) is actuated, and a suitable fast-speed drive motor is energized to transport the magnetic tape in the reverse direction at the fast speed.

FAST FORWARD switch 58 may be similar to REWIND switch 56 and is adapted, when operated, to establish the "fast-forward" mode of operation. More particularly, the operation of the FAST FORWARD switch produces an actuating signal which is detected by the microprocessor to energize a fast-forward circuit and to energize the fast-speed motor, whereby the magnetic tape is driven in the forward direction at the fast speed. In one embodiment, the operation of either REWIND switch 56 or FAST FORWARD switch 58 does not enable the detection of letter or instruction indicating signals recorded on the magnetic tape. Rather, the tape merely is transported in the reverse or forward direction, as selected.

ERASE switch 62 is adapted to be actuated concurrently with either REWIND switch 56 or FAST-FORWARD switch 58 so as to establish an "erase" mode. The actuation of the respective switches is detected by the microprocessor which serves to energize the fast-speed motor so as to drive the magnetic tape in either the reverse or forward direction. Also, an electromagnetic erase circuit is triggered so as to erase the audio information which may have been recorded previously on the magnetic tape.

As illustrated, dictation/transcription unit 10 also is provided with index/instruction display 24 and with a numerical display 26. The index/instruction display may be of the type described in U.S. Pat. No. 4,200,893. As mentioned above, this display provides indications of the locations of particular letter and instruction indicating signals which are recorded on the magnetic tape, which signals are detected during a "scan" or a "search" operation. Display 24 also provides an index, or cursor, indication of the present relative location of the magnetic tape. Thus, as the tape is driven in a particular direction (i.e. either in the forward or reverse direction), a respective display element, such as a light source, an LED, an LCD, or the like, is energized to indicate that portion of the tape which is at or within the vicinity of the recording/playback transducer. As the tape is advanced from one end towards the other, a corresponding cursor indication is advanced across display 24. A further description of index/instruction display 24 is set out in the aforementioned U.S. Pat. No. 4,200,893.

Numerical display 26 may be comprised of a multi-digit display, such as a two- or three-digit seven-segment display which, among other functions is adapted to display the total length of dictation which has been recorded on the magnetic tape. This display may be controlled by a counter which counts pulses, referred to herein as chopper pulses, that are produced when the tape is transported. In one embodiment, a so-called chopper wheel is mechanically coupled to the supply (or take-up) drive spindle and is rotated as tape is transported so as to periodically interrupt a light beam which impinges upon a photodetector. Each interruption of the light beam produces a chopper pulse. Hence, the frequency of these chopper pulses is a function of the speed at which the tape is driven and also a function of the amount of tape which remains on the supply (or take-up) reel. In another embodiment, the chopper wheel is comprised of a disk having a plurality of magnetic pole elements disposed circumferentially thereabout. As the tape is transported, this chopper wheel rotates so as to pass successive pole elements across a magnetic pick-up device, such as a pick-up coil. A chopper pulse is produced in response to the passage of each pole element across the pick-up coil.

As mentioned above, a microprocessor is provided for controlling the various operating conditions of dictation/transcription machine 10 in response to the actuation of any of the toggle switches, the keyboard switches or the switches provided on microphone unit 12. This microprocessor also is responsive to certain additional switches, such as foot-pedal switches, cradle power switch 72 and switches on an accessory that may be connected to the machine, such as hook switch 82 of accessory unit 74. As described above, a digital signal is supplied from microphone unit 12 to dictation/transcription machine 10 representing the actuation of a selected one of the switches included in the microphone unit. In the event that the microphone unit is replaced by a foot-pedal switching arrangement, a digital signal is supplied to the dictation/transcription machine representing the particular switch in that arrangement which has been actuated. Similarly, if cradle power switch 72 is opened or closed, or if the accessory switches, such as hook switch 82, are actuated, these conditions are represented by a digital signal supplied to the machine. Also, if any of the toggle or keyboard switches 18 is actuated, a signal representing the actuation of the particular switch is produced. An encoder is responsive to the aforementioned digital signals and actuating signals to produce a plural-bit signal representing the particular switch which has been actuated. This plural-bit signal is supplied to the microprocessor which, for example, may be a Model COPS 420, manufactured by National Semiconductor. In addition, the microprocessor may be supplied with the chopper pulses which are produced by the apparatus described above, with a signal representing the detection of a cue signal reproduced from the magnetic tape, and with a signal representing the presence or absence of a cassette 22 in compartment 20. The signal representing the detection of a cue signal may be derived from a cue signal detector, such as described in the aforementioned U.S. Pat. No. 4,200,893. The signals representing the presence or absence of a cassette 22 may be produced by a suitable switch which is closed when a cassette is loaded in compartment 20.

It may be appreciated that the functions performed by the microprocessor may be carried out by equivalent hard-wired logic circuitry. However, such hard-wired logic circuitry is relatively expensive and is difficult to assemble. Furthermore, the possibility of a fault or other malfunction in such hard-wired logic circuitry is greater than the possibility of a comparable fault or malfunction in the microprocessor. For these reasons, it is preferred that a microprocessor be used to control the selected operating conditions of dictation/transcription machine 10.

The programming of a microprocessor to carry out particular sequential instructional routines during a program cycle is well known to those of ordinary skill in the art. The relevant instructional program by which the microprocessor included in dictation/transcription machine 10 carries out the features of the present invention will, therefore, be described in terms of flow charts. These flow charts describe the overall broad function of the microprocessor, and further describe those particular routines by which the present invention is carried out. A programmer having ordinary skill in the art would be readily enabled to program a microprocessor, or other programmed processor, such as a mini-computer or the like, from the flow charts which now will be described.

Figure 2:
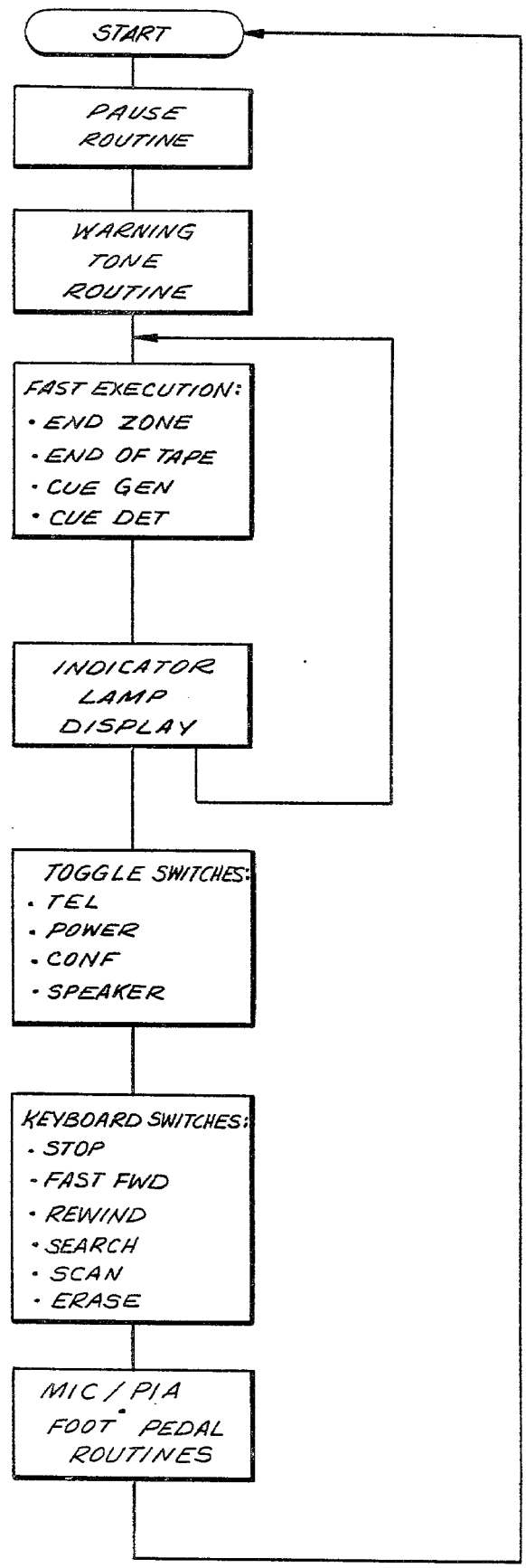
FIG. 2 is an overall flow chart of operation of the microprocessor which is used with the machine shown in FIG. 1 for controlling the operation of that machine.

Turning to FIG. 2, there is illustrated an overall flow chart representing the operation of the microprocessor through one complete program cycle. A suitable clock (not shown) generates successive clock pulses which are used for advancing the microprocessor through a sequence of instructions. Initially, the microprocessor advances from its START condition to carry out a pause routine. This pause routine routine is responsive to certain predetermined conditions which, when detected, serve to halt temporarily the forward or reverse movement of the magnetic tape. The duration of this "pause" of tape movement is determined by a pause counter that is incremented in synchronism with the instruction clock pulses.

After cycling through the pause routine, the microprocessor carries out a warning tone routine. This warning tone routine serves to produce a warning tone in response to the existence of certain conditions, including the condition that the tape has been temporarily halted. Other conditions which are sensed during the warning tone routine include end-of-tape, absence of a cassette, less than a predetermined length of tape available for recording.

After cycling through the warning tone routine, the microprocessor program advances to the so-called "fast execution" routine. The fast execution routine is adapted to sense when the magnetic tape has been advanced to its end zone, or when the end of the magnetic tape has been reached, or when a cue signal is generated for recording a letter or instruction indicating signal, or when a cue signal is detected, as when a letter or instruction indicating signal is sensed. The "end zone" is intended to describe that section of the magnetic tape which is reached wherein less than a predetermined amount of tape remains on the supply reel. For example, if a cassette is used having a quantity of magnetic tape capable of recording up to thirty minutes of dictation, the end zone is reached when the tape has been transported from the supply reel to the take-up reel such that the amount of tape remaining for the recording of new dictation is equal to a dictation time of about 2–3 minutes. The end zone subroutine senses when this amount of magnetic tape remains, and a suitable end zone indication is provided so as to warn the dictator that he soon will approach the end of tape. This end zone detection and warning subroutine is carried out when dictation/transcription machine 10 operates in its "record" mode, either to record dictation from microphone unit 12 (or accessory unit 74) or to record incoming telephone messages that are received via the telephone adapter (not shown).

The end-of-tape (EOT) subroutine serves to detect when the tape has been fully transported either from the supply reel to the take-up reel or from the take-up reel back to the supply reel, and to provide a suitable indication thereof. The EOT condition may arise during the "record", "play", "fast-forward", or "rewind" operations of dictation/transcription machine 10. The EOT indication apprises the user of the machine that the end (or beginning) of the tape has been reached.

The cue generate subroutine is described in greater detail in copending application Ser. No. 178,357 and is adapted to detect when cue switch 33 is operated and to record either a letter or instruction indicating signal, depending upon the selected operation of the cue switch. As described above, the cue signal is an oscillating signal of predetermined frequency, for example, 15 Hz. A letter indicating signal is constituted by a single burst of cue signal of predetermined duration; and an instruction indicating signal is constituted by two successive bursts of the cue signal, each of these bursts being of the same predetermined duration and separated by a defined interval. The cue detect subroutine is carried out during, for example, "scan", "search", "fast-forward" and "rewind" modes of operation; and serves to detect the reproduction of a cue signal. If the reproduced cue signal is detected as being a letter indicating signal, a letter-indicating light element of display 24 is energized so as to indicate the relative location of the recorded letter indicating signal. Conversely, if the sensed cue signal is a detected instruction indicating signal, then a suitable light element of display 24 is energized so as to apprise the operator of the relative whereabouts of the recorded instruction indicating signal. Various additional functions are carried out during the cue detect subroutine, as is described in the aforementioned copending application.

The subroutines included in the fast execution routine are carried out sequentially. When the programmed microprocessor cycles through the complete fast execution routine, an indicator lamp display routine is carried out. For the purpose of the present discussion, it is assumed that indicator lamps are provided beneath at least the following toggle and keyboard switches: TELEPHONE switch 44, CONFERENCE switch 46, SPEAKER switch 48, SEARCH switch 54, REWIND switch 56, FAST-FORWARD switch 58, SCAN switch 60 and ERASE switch 62. Indicator lamps also may be provided beneath POWER switch 42 and INSERT switch 52. The POWER indicator lamp may be illuminated whenever energizing power is supplied to dictation/transcription machine 10, as when the POWER switch is acutated, cradle switch 72 is closed, an accessory power switch such as hook switch 82 is closed, or the like. The INSERT indicator lamp may be energized when a suitable insert signal is produced in response to the actuation of INSERT switch 52. The remaining indicator lamps are selectively energized by the microprocessor, one lamp at a time, during the indicator lamp display routine. Each indicator lamp, when energized, draws a significant amount of current therethrough. That is, when an indicator lamp first is turned on, a significant amount of energizing current flows therethrough. To minimize current requirements, each of the TELEPHONE, CONFERENCE, SPEAKER, SEARCH, REWIND, FAST-FORWARD, SCAN and ERASE indicator lamps is interrogated in sequence and, if the interrogated lamp is to be energized, that lamp is illuminated. In accordance with the flow chart shown in FIG. 2, at the completion of one cycle of the fast execution routine, one of these indicator lamps is interrogated and, if appropriate, it is illuminated. Then, the programmed routine returns to the fast execution routine to perform another cycle thereof. At the completion of this cycle, the next indicator lamp is interrogated and selectively energized. This recycling of the fast execution routine, followed by the indicator lamp display routine, is carried out until all eight of these indicator lamps are interrogated and selectively energized. At the completion of the eighth cycle of the fast execution and indicator lamp display routines, the programmed microprocessor advances to the switch detecting routines.

The switch detecting routines are divided into three separate routines: the toggle switch routine, the keyboard switch routine and the microphone switch routine. These routines are adapted to detect which, if any, of the toggle switches has been actuated, which, if any, of the keyboard switches has been actuated and which, if any, of the microphone unit switches has been actuated, respectively. The toggle switch routine, which is described in greater detail below, detects if TELEPHONE switch 44 has been actuated. If so, it is determined whether this is an initial or reactuation of the TELEPHONE switch. If it is determined that the TELEPHONE switch has been actuated for the first time, then dictation/transcription machine 10 is disposed in its "telephone" mode so as to be conditioned to record incoming telephone messages. If a telephone adapter (sometimes referred to herein as a phone-in adapter, or PIA) is connected to the machine, than the machine assumes its quiescent mode awaiting the receipt of an incoming telephone call. Also, energizing power is supplied to the machine to enable it to commence recording upon receipt of such an incoming telephone call.

Depending upon particular conditions and parameters which are present, at the completion of the telephone toggle switch subroutine, the programmed microprocessor either returns to its START condition or advances to the power subroutine. In this subroutine, the actuation of POWER switch 42 is detected, and either energizing power is supplied to dictation/transcription machine 10 in response to the initial actuation of this POWER switch, or energizing power is terminated in response to the re-actuation of this POWER switch. The power subroutine also detects whether cradle switch 72 has been opened or closed, whether the accessory switch (e.g. hook switch 82) has been actuated, or whether the telephone adapter (PIA) has received or completed an incoming telephone call. These latter conditions also serve to selectively supply or terminate energizing power (that is, they serve to turn power on or off) to the dictation/transcription machine.

After carrying out the power subroutine, the programmed microprocessor advances to the conference subroutine to detect whether CONFERENCE switch 46 has been actuated or re-actuated. As mentioned above, actuation of the CONFERENCE switch establishes the "conference" mode of operation, wherein audio signals are subjected to a relatively higher level of amplification prior to recording. The re-actuation of this CONFERENCE switch terminates the "conference" mode.

After carrying out the conference subroutine, the programmed microprocessor advances to carry out the speaker subroutine, whereby the actuation or re-actuation of SPEAKER switch 48 is detected. Depending upon the selective actuation of this SPEAKER switch, one or the other of the loudspeakers provided in dictation/transcription machine 10 and in microphone unit 12 is selected for use. After the speaker subroutine is carried out, the programmed microprocessor advances to carry out the keyboard switch routine.

The foregoing description of the toggle switch routine has assumed that the telephone, power, conference and speaker subroutines are carried out sequentially in this order. If desired, these subroutines may be carried out in any other order.

The keyboard switch routine includes various subroutines which are carried out sequentially and in a predetermined hierarchy. This hierarchy is a function of the priority of the particular switch which is associated with the subroutine. Initially, the stop subroutine is performed to detect whether STOP switch 50 has been actuated. If so, all tape movement is terminated, or cancelled, and the operating mode in which dictation/transcription unit 10 had been disposed also is terminated. Then, the keyboard switch routine advances to the fast-forward subroutine, whereby the operating mode of the machine is changed over to the fastforward mode in response to the actuation of FAST-FORWARD switch 58. If this FAST-FORWARD switch had not been actuated, then the keyboard switch routine proceeds to the rewind subroutine to detect if REWIND switch 56 had been actuated. If so, the operating mode in which the dictation/transcription machine then is disposed is changed over to the "rewind" mode; whereby the magnetic tape is rewound at its relatively fast speed.

If the REWIND switch had not been actuated, the keyboard switch routine advances to the search subroutine to sense if SEARCH switch 54 had been actuated. If so, the existing mode of operation of dictation/transcription machine 10 is cancelled, and this machine then is changed over to its "search" mode operation. As mentioned above, in this "search" mode, the magnetic tape is driven in the forward direction at the fast speed, and instruction indicating signals, recorded as dual bursts of cue signals, are detected.

The initial subroutine carried out in the keyboard switch routine is the stop subroutine. If it is determined that the STOP switch has not been actuated, the scan subroutine is carried out. In this subroutine, actuation of SCAN switch 60 is detected to change over the dictation/transcription machine to the "rewind" mode of operation so as to detect cue signals which are reproduced while the magnetic tape is rewound.

In the event that SCAN switch 60 is not actuated, the keyboard switch routine advances to the erase subroutine. In this erase subroutine, the actuation of ERASE switch 62 is detected. The "erase" mode of operation is established if, concurrent with the actuation of ERASE switch 62, either REWIND switch 56 or FAST-FORWARD switch 58 also is actuated. In the "erase" mode, the magnetic tape is transported in either the reverse or forward direction, at fast speed, and the erase transducer is energized. Hence, all information which is recorded on the magnetic tape is erased therefrom.

After completing the keyboard switch routine, the programmed microprocessor advances to the microphone switch routine. This routine is adapted to sense which, if any, of the switches provided in microphone unit 12 is actuated, and to establish a corresponding operating mode in response thereto. The microphone routine also functions to detect various switch control signals that are produced by a telephone adapter (PIA) connected to dictation/transcription machine 10 when this machine is in its "telephone" mode of operation. Also, in the event that microphone unit 12 is replaced by a foot-pedal switching arrangement or an accessory unit, the microphone switch routine serves to detect which of the foot-pedal or accessory switches is actuated to dispose the dictation/transcription machine in a corresponding mode of operation.

The microphone switch routine determines whether microphone unit 12 is connected to dictation/transcription machine 10 and, if so, detects the actuation of record lock switch 32, or the actuation of stop switch 38, or the actuation of record switch 36, or the actuation of cue switch 33. Depending upon which of these switches is actuated, the appropriate mode of operation of dictation/transcription machine 10 is established. In the event that none of these record lock, stop, record, and cue switches is actuated, the microphone routine advances to detect if fast-forward switch 35 or rewind switch 37 is actuated. If so, the corresponding "fast-forward" or "rewind" mode of operation is established. That is, the magnetic tape is driven at its fast speed in either the forward or reverse direction. Also, in either of these modes, the reproduction of a cue signal from the magnetic tape is detected and indicated, as described in aforementioned application No. 178,357.

In the event that microphone unit 12 is replaced by the foot-pedal switching arrangement, the microphone routine detects which, if any, of the fast-forward, rewind and play pedal switches is actuated, in this order. Depending upon which of these foot-pedal switches is actuated, the corresponding mode of operation (i.e. "fast-forward" or "rewind" or "play") is established.

After completing the microphone routine, the programmed microprocessor returns to its START condition and commences the pause routine once again. From the foregoing description, it is appreciated that the microprocessor completes one cycle of sequential instructions, during which one cycle the fast execution routine is performed a predetermined number of times, for example, eight times. That is, the pause routine is carried out, followed by the warning tone routine, and then the fast execution routine is performed followed by the indicator lamp display routine, these two routines being performed repeatedly, and at the instruction clock rate, eight successive times. After the fast execution routine and indicator lamp display routine have been performed for the eighth time, the programmed microprocessor advances to carry out the toggle switch routine, and then the keyboard switch routine, and then the microphone routine to complete one full cycle of the program.

Figure 3:
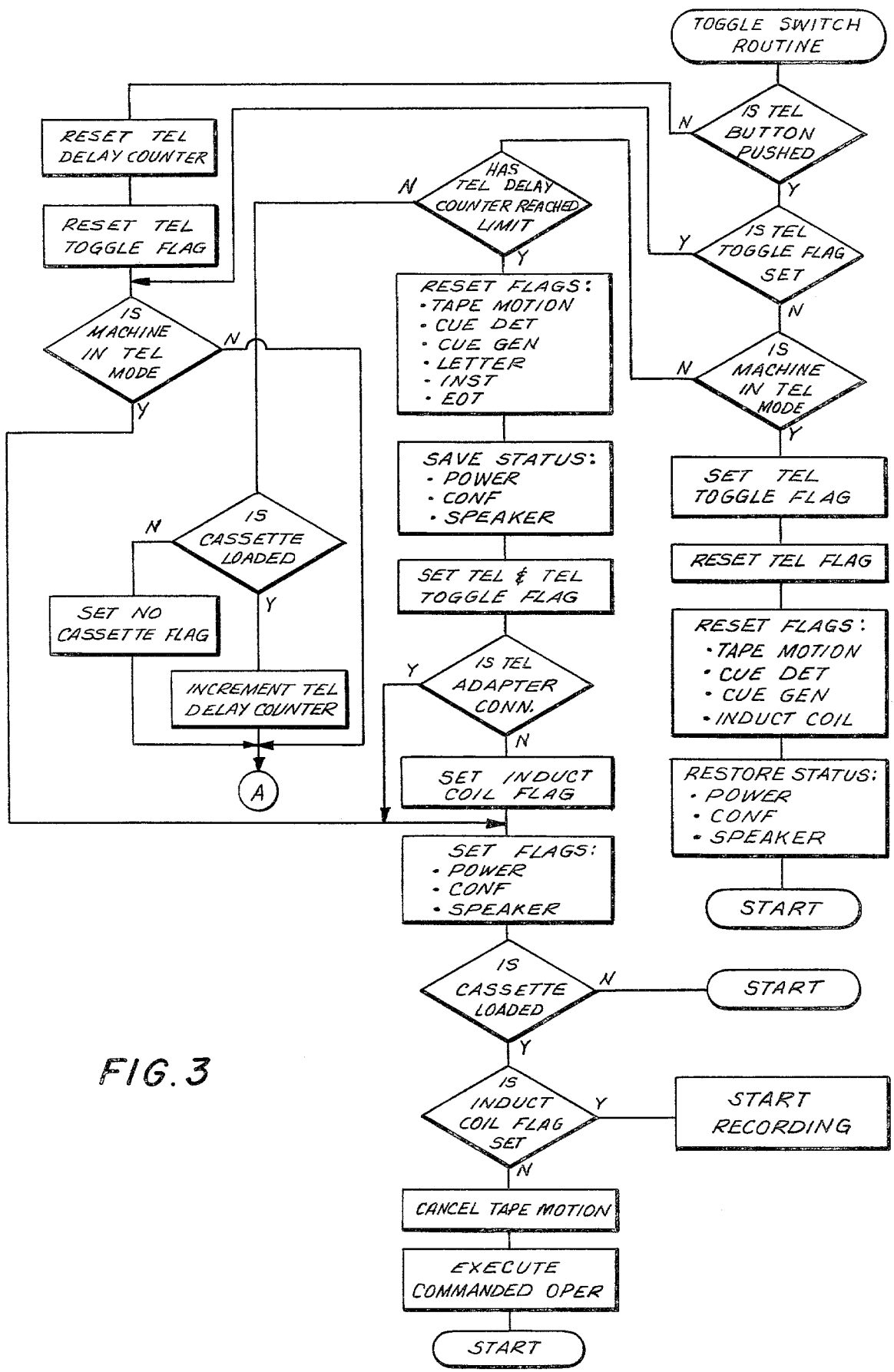
FIG. 3 is a flow chart illustrating the manner in which the microprocessor controls the telephone mode of operation of the dictation/transcription machine, in accordance with one aspect of the present invention.

Turning now to FIG. 3, a flow chart is illustrated, representing the manner in which the telephone switch subroutine, included within the toggle switch routine, is carried out. It is appreciated that this toggle switch routine is performed after the fast execution and indicator lamp display routines have been repeated eight times. Initially, inquiry is made as to whether TELEPHONE switch 44 has been actuated. If the telephone switch is a touch-sensitive switch, this inquiry refers to whether switch 44 is then being touched. If the telephone switch is a push-button switch, then this inquiry refers to whether this switch is depressed. If the answer to this inquiry is in the negative, a telephone delay counter is reset. This telephone delay counter is described in greater detail below. In addition to resetting the telephone delay counter, a telephone toggle flag signal is reset. Then, inquiry is made as to whether the dictation/transcription machine is disposed in its telephone mode. It may be appreciated that TELEPHONE switch 44 is actuated either to establish or terminate the telephone mode of operation. Of course, the particular function which is achieved by the actuation of this switch is dependent upon the mode of operation in which the machine then is disposed. If this inquiry is answered in the negative, the programmed toggle switch routine advances to the power switch subroutine, shown in FIGS. 4A and 4B, and described below. However, if the inquiry as to whether the dictation/transcription machine is disposed in its telephone mode is answered in the affirmative, then power, conference and speaker flag signals all are set. It may be appreciated that such flag signals are generated by, for example, bi-state circuits, such as flip-flop circuits, or the like, and these flag signals serve, among other functions, to actuate the indicator lamps which may be disposed beneath the POWER, CONFERENCE and SPEAKER switches of dictation/transcription machine 10. That is, when these flag signals are set, the corresponding indicator lamps are energized. Conversely, when these flag signals are reset, their associated indicator lamps are de-energized.

Returning to the beginning of the illustrated telephone switch subroutine, if the initial inquiry as to whether telephone switch 44 is actuated is answered in the affirmative, inquiry then is made as to whether the telephone toggle flag signal is set. The purpose of this telephone toggle flag signal is to avoid unnecessary and redundant steps in the telephone switch subroutine. If the answer to this inquiry is in the affirmative, the telephone switch subroutine advances to inquire if the dictation/transcription machine is disposed in its telephone mode. This inquiry has been discussed above. However, if the telephone toggle flag signal has not been set, a different path in the telephone switch subroutine is followed, this path commencing with the inquiry of whether dictation/transcription machine 10 is disposed in its telephone mode. If not, inquiry then is made as to whether the aforementioned telephone delay counter has attained its predetermined limit count. If this predetermined count has not been reached, inquiry is made as to whether a cassette 22 is loaded in compartment 20 of machine 10. If so, the telephone delay counter is incremented by one count, and the programmed microprocessor advances to the power switch subroutine. However, if a cassette has not been loaded, a "no cassette" flag signal is set, and then the programmed routine advances to the power switch subroutine. The setting of this no cassette flag signal is utilized when the warning tone routine is carried out to generate a warning tone which apprises an operator that a cassette has not been loaded. Furthermore, in the absence of the cassette flag signal, a recording operation is inhibited.

The purpose of the telephone delay counter now will be described. It will be appreciated, from the discussion of the telephone switch subroutine, that when TELEPHONE switch 44 is actuated, any operating condition which may otherwise have been present is overridden. For example, if information was reproduced from cassette 22, or if the dictation/transcription machine had been operating to record dictated information onto the magnetic tape of cassette 22, or if the magnetic tape was transported in the fast-forward, rewind, scan or search modes, such operations are cancelled. It is, therefore, advantageous to distinguish a deliberate actuation of TELEPHONE switch 44 from an unintentional actuation thereof. It is assumed that an unintentional actuation of the telephone switch will be relatively brief. However, a deliberate actuation of the telephone switch to establish the telephone mode of operation generally will entail a manual operation of this switch for at least a predetermined time period. The purpose of the telephone delay counter is to detect if TELEPHONE switch 44 has been manually operated for this predetermined time period. Thus, and as is seen from the flow chart shown in FIG. 3, if dictation/transcription machine 10 is not disposed in its telephone mode, but the actuation of TELEPHONE switch 44 has been sensed, each cycle of the programmed microprocessor through its set of instructions, that is, each cycle of the microprocessor through the routines illustrated in FIG. 2, will result in an increment by one count of the telephone delay counter once each cycle. As a numerical example thereof, the microprocessor performs one complete cycle through its instructions every 40 milliseconds. Hence, the telephone delay counter is incremented periodically at the rate of one count every 40 milliseconds.

After the microprocessor has cycled through its routines a predetermined number of times, the telephone delay counter will attain its predetermined limit count. At that time, the inquiry as to whether this telephone delay counter has reached its limit count will be answered in the affirmative. Then, various flag signals which are associated with corresponding operating conditions of the dictation/transcription machine will be reset. As shown in FIG. 3, the tape motion flag signal, representing that the the tape is being transported, either in the forward direction (at normal or high speeds) or in the reverse direction is reset. This means that tape movement is halted. Also, the cue detect, cue generate, letter and instruction flag signals, all described in copending application Ser. No. 178,357 are reset. Furthermore, the end-of-tape (EOT) flag signal, representing that the tape is fully wound on the supply or take-up reels, is reset. Once these flag signals have been reset, the telephone mode of operation may be established. In this mode, control over tape motion, as well as the setting of the cue generate and EOT flags, is achieved by the telephone adapter (PIA), described in copending application Ser. No. 146,779.

After the aforementioned flag signals have been reset, the status of POWER switch 42, CONFERENCE switch 46 and SPEAKER switch 48 are stored. It is appreciated that these switches function as the aforementioned toggle switches and, depending upon whether each switch is actuated or reactuated, establishes or terminates a corresponding condition. When POWER switch 42 is actuated, power is supplied to the dictation/transcription machine. Also, the power flag signal is set, and this flag signal is used to energize the power indicating lamp. When the POWER switch is reactuated, power is terminated, the power flag signal is reset and the power indicating lamp is de-energized. When CONFERENCE switch 46 is actuated, the aforementioned conference mode is established, whereupon the amplification of the audio signals which are recorded on the magnetic tape is increased. Also, the conference flag signal is set, and this flag signal is used to energize the conference indicating lamp. Conversely, when CONFERENCE switch 46 is reactuated, the conference mode is terminated so as to reduce the amplification of the audio signals which are recorded, the conference flag is reset and the conference indicating lamp is de-energized. When SPEAKER switch 48 is actuated, the speaker which is integral with dictation/transcription 10 is selected to transduce the audio signals which are reproduced on the magnetic tape. Also, the speaker flag signal is set, and this is used to energize the speaker indicating lamp. Conversely, when the SPEAKER switch is reactuated, the speaker provided in microphone unit 12 is selected to transduce the reproduced audio signals. Also, the speaker flag signal is reset and the speaker indicating lamp is de-energized. It may be appreciated, therefore, that when the status of the POWER, CONFERENCE and SPEAKER switches are saved, the particular set or reset states of the POWER, CONFERENCE and SPEAKER flags are stored. Thus, the status of the then-existing operating conditions which are determined by these switches are stored. As will be described, the stored status of these switches are restored when the telephone mode of operation is terminated. Hence, at the termination of the telephone mode, the power, conference and speaker conditions which had existed prior to the actuation of TELEPHONE switch 44 all are restored.

Continuing with the flow chart shown in FIG. 3, after the status of the POWER, CONFERENCE and SPEAKER switches are stored, the telephone flag signal and the telephone toggle flag signal both are set. The setting of the telephone flag signal serves to establish the telephone mode of operation and, moreover, this flag signal energizes the telephone indicating lamp associated with TELEPHONE switch 44.

After setting the telephone and telephone toggle flag signals, inquiry is made as to whether a telephone adapter (PIA) is connected to the dictation/transcription machine. If the answer to this inquiry is in the affirmative, then the power, conference and speaker flag signals all are set. This does not interfere with the previous status of these flag signals which had been stored. Now, since all of the power, conference and speaker flag signals are set, the corresponding power, conference and speaker indicating lamps all are energized.

If the inquiry as to whether the telephone adapter is connected to the machine is answered in the negative, then an induction coil flag signal is set. Although the dictation/transcription machine advantageously is adapted to operate with a telephone adapter (PIA), information communicated over the telephone network may be recorded on the magnetic tape by use of an induction coil. As is known, an induction coil, when disposed in close proximity to a telephone instrument, is adapted to have voice signal currents induced therein in response to the voice signal currents which are communicated over the telephone network. These induced voice signal currents may be recorded on the magnetic tape. Thus, if a telephone adapter (PIA) is not connected to the dictation/transcription machine, it is assumed that, when the telephone mode is established, an induction coil is connected, and this induction coil flag signal is set.

After the induction coil flag signal is set, the aforementioned power, conference and speaker flag signals all are set, as described above. Then, inquiry is made as to whether a cassette 22 is loaded properly into compartment 20. If this inquiry is answered in the negative, that is, if a cassette is not loaded, the programmed microprocessor returns to its START condition, illustrated in FIG. 2. If a cassette is properly loaded, inquiry then is made as to whether the induction coil flag signal is set. If so, a recording operation is commenced directly. If the induction coil flag is not set, any existing tape motion is cancelled, and the microprocessor responds to a suitable command to establish a corresponding operating condition. Thus, if the telephone adapter (PIA) is connected to the dictation/transcription machine, and if the telephone mode now has been established, the microprocessor senses if any operation is commanded and, if so, serves to execute that command. Typical of such operations which can be commanded by the telephone adapter are the "record", the "rewind", the "fast forward", the "cue generate", the "stop", the "idle" and the "power off" operations. These operations are described in copending application Ser. No. 146,779. It may be appreciated that the particular operation which is commanded by the telephone adapter is represented by a suitably encoded digital signal, such as a 3-bit signal. After the commanded operation is executed, the programmed microprocessor returns to its START condition.

The aforedescribed path of the flow chart shown in FIG. 3 is followed if TELEPHONE switch 44 is operated, the telephone toggle flag signal is not set and the dictation/transcription machine is not disposed in its telephone mode. If, however, the dictation/transcription machine exhibits its telephone mode of operation, then, in response to the operation of TELEPHONE switch 44, the telephone toggle flag signal is set, as illustrated in FIG. 3. Also, the telephone flag is reset, thereby indicating that the telephone mode should be terminated. Furthermore, those flag signals which can be set in response to a commanded operation during the telephone mode now are reset. Such flag signals include the tape motion flag signal, the cue detect and cue generate flag signals, and the induction coil flag signal. The tape motion, cue detect and cue generate flag signals are described in copending application Ser. No. 146,779, and are set when tape is commanded to be transported in the forward or reverse direction, when cue signals are detected and when cue signals are generated, respectively. The induction coil flag signal is set under the conditions described above.

In addition to resetting these flag signals, the status of the POWER, CONFERENCE and SPEAKER switches are restored. It is recalled that such status had been stored when the telephone mode was initiated. Thus, a suitable storage means may be provided, which storage means may be included in the memory device of the microprocessor, in which the status of the power, conference and speaker flag signals are stored when the telephone mode is initiated, and from which the status of these flag signals are read when the telephone mode is terminated. Depending upon the restored status of the power, conference and speaker flag signals, the corresponding power, conference and speaker indicating lamps are selectively energized. Then, the programmed microprocessor returns to its START condition.

In operation, it is appreciated that the microprocessor cycles through the respective routines, illustrated in FIG. 2. In accordance with the numerical example discussed above, the cycle time for one complete cycle of such routine is equal to 40 milliseconds. Thus, the toggle switch routine and, particularly, the telephone switch subroutine, is performed once every 40 milliseconds. Let it be assumed that telephone switch 44 is not operated. Accordingly, during each cycle of the telephone switch subroutine, the inquiry as to whether the telephone switch has been pushed is answered in the negative. Let it be further assumed that dictation/transcription machine 10 is not disposed in its telephone mode. Hence, for so long as TELEPHONE switch 44 is not operated, the inquiry as to whether this telephone switch is pushed is answered in the negtive, the telephone delay counter is reset to an initial count, the telephone toggle flag signal remains reset and, since the dictation/transcription machine is not disposed in its telephone mode, the programmed microprocessor exits from the illustrated telephone switch subroutine to carry out the power switch subroutine, described below with respect to FIGS. 4A and 4B. The microprocessor continues to follow this path until TELEPHONE switch 44 is operated.

Upon the actuation of the telephone switch, the inquiry as to whether this switch is pushed now is answered in the affirmative. At the present time, however, since the telephone toggle flag signal had been reset prior to the actuation of the telephone switch, the inquiry as to whether this telephone toggle flag signal is set is answered in the negative. Furthermore, since dictation/transcription machine has not yet been disposed in its telephone mode, inquiry next is made as to whether the telephone delay counter has reached its predetermined limit count. Since this counter had been reset prior to the actuation of the telephone switch, this inquiry is answered in the negative. Assuming that a cassette is loaded properly in compartment 20, the telephone delay counter is incremented by one count, and then the programmed microprocessor advances to the power switch subroutine, to be described.

If the actuation of TELEPHONE switch 44 is deliberate, then this switch remains operated during the next and subsequent cycles of the microprocessor. It is appreciated from FIG. 3, that the telephone delay counter is, therefore, incremented by one count during each cycle of the programmed microprocessor. Of course, if TELEPHONE switch 44 is released prior to the time that this delay counter reaches its predetermined limit count, then, in response to the inquiry as to whether the telephone switch is pushed, the telephone delay counter is reset to its initial count. It is assumed herein that the telephone switch remains pushed until the telephone delay counter attains its predetermined limit count. At that time, since the telephone switch is pushed, the telephone toggle flag signal is not set and the machine is not yet in its telephone mode, inquiry as to whether the telephone delay counter has reached its predetermined limit count is answered in the affirmative. Consequently, the tape motion, cue detect, cue generate, letter, instruction and EOT flag signals, regardless of their then-existant states, all are reset. Also, the individual conditions of the power, conference and speaker switches, that is, the states of the corresponding power, conference and speaker flag signals, are stored. For example, if power had not been supplied, if the "conference" mode had been selected and if the speaker which is integral with dictation/transcription machine 10 had been selected, these conditions are stored. Then, both the telephone and telephone toggle flag signals are set. The setting of the telephone flag signal initiates the telephone mode of operation.

After these flag signals are set, inquiry is made as to whether a telephone adapter (PIA) is connected to the dictation/transcription machine. In accordance with the present example, it is assumed that an adapter is connected, and this inquiry is answered in the affirmative. Consequently, the induction coil flag is not set. Next, all of the power, conference and speaker flag signals are set. It is recalled that this results in energizing the power, conference and speaker indicating lamps, respectively. The following inquiry as to whether a cassette is properly loaded in machine 10 is answered in the affirmative. Next, since the induction coil flag signal had not been set, all existing tape motion is cancelled, and the programmed microprocessor is conditioned to execute whatever operation subsequently may be commanded. Since dictation/transcription machine 10 now is disposed in its telephone mode, it is expected that such commanded operation is derived from the telephone adapter (PIA). Also, now in its telephone mode, the programmed microprocessor returns to the START condition.

When the telephone switch subroutine next is performed, let it be assumed that TELEPHONE switch 44 remains operated. Therefore, since the telephone switch is pushed, and since the telephone toggle flag is set, inquiry next is made as to whether dictation/transcription machine 10 is disposed in its telephone mode. This inquiry is, of course, answered in the affirmative, so that the power, conference and speaker flag signals remain set. The telephone switch subroutine then continues in the manner described above.

If, during the next performance of the telephone switch subroutine, the telephone switch is released, the inquiry as to whether the telephone switch is pushed is answered in the negative. Accordingly, the telephone delay counter now is reset to its initial count, the telephone toggle flag signal is reset and inquiry once again is made as to whether dictation/transcription machine 10 is disposed in its telephone mode. This inquiry is answered in the affirmative, thereby maintaining the power, conference and speaker flag signals in their set states. The subroutine then continues in the manner discussed above.

Since the telephone toggle flag signal (but not the telephone flag signal) has been reset, the telephone switch subroutine is conditioned to respond to the next operation, or reactuation, of TELEPHONE switch 44. The dictation/transcription machine now is disposed in its telephone mode. It is recognized that the reactuation of TELEPHONE switch 44 serves to terminate this mode. If the telephone switch now is operated, the inquiry of whether the telephone switch is pushed now is answered in the affirmative. Since the telephone toggle flag signal had been reset, inquiry next is made as to whether dictation/transcription machine 10 is disposed in its telephone mode. This inquiry now is answered in the affirmative, thereby setting the telephone toggle flag signal and resetting the telephone flag signal. Consequently, the telephone mode of operation is terminated. In addition, all tape motion, cue detect, cue generate and induction coil flag signals are reset. Then, the stored status of the power, conference and speaker switches are restored. In accordance with the present example, the restoration of the stored status of the power switch results in terminating power supplied in the dictation/transcription machine. Of course, if the power ON condition had been present at the time that the telephone mode was established, then when this telephone mode of operation is terminated, the power ON condition will remain. The programmed microprocessor then returns to its START condition.

In the aforedescribed operation of the telephone switch subroutine, it has been assumed that a telephone adapter (PIA) is connected to dictation/transcription machine 10. If, on the contrary, an adapter is not connected, then, after the telephone delay counter had reached its predetermined limit count, and after the tape motion, cue detect, cue generate, letter, instruction and EOT flag signals had been reset, the status of the power, conference and speaker switches had been stored and the telephone and telephone toggle flag signals had been set, the inquiry as to whether an adapter is connected to the dictation/transcription machine will be answered in the negative. Consequently, the induction coil flag signal is set. This means that, after the power, conference and speaker flag signals all are set, if a cassette is loaded properly in the machine, a recording operation commences directly. Thus, information picked up by that induction coil is recorded. Of course, after the telephone mode is established, if the telephone switch is reactuated, after the telephone flag signal is reset, so as to terminate this mode, the induction coil flag signal, among others is reset. This, of course, terminates the recording operation.

In accordance with the aforedescribed operation of the telephone switch subroutine, it is seen that, if dictation/transcription machine 10 is disposed in its telephone mode, none of the other toggle switch subroutines is carried out. However, if the dictation/transcription machine is not disposed in its telephone mode, the programmed microprocessor advances to the power switch subroutine each time that the toggle switch routine is carried out. That is, if the telephone mode is not established, each complete cycle of the programmed microprocessor includes the carrying out of the power switch subroutine. This subroutine is illustrated in FIGS. 4A and 4B, and now will be described.

Figure 4A:
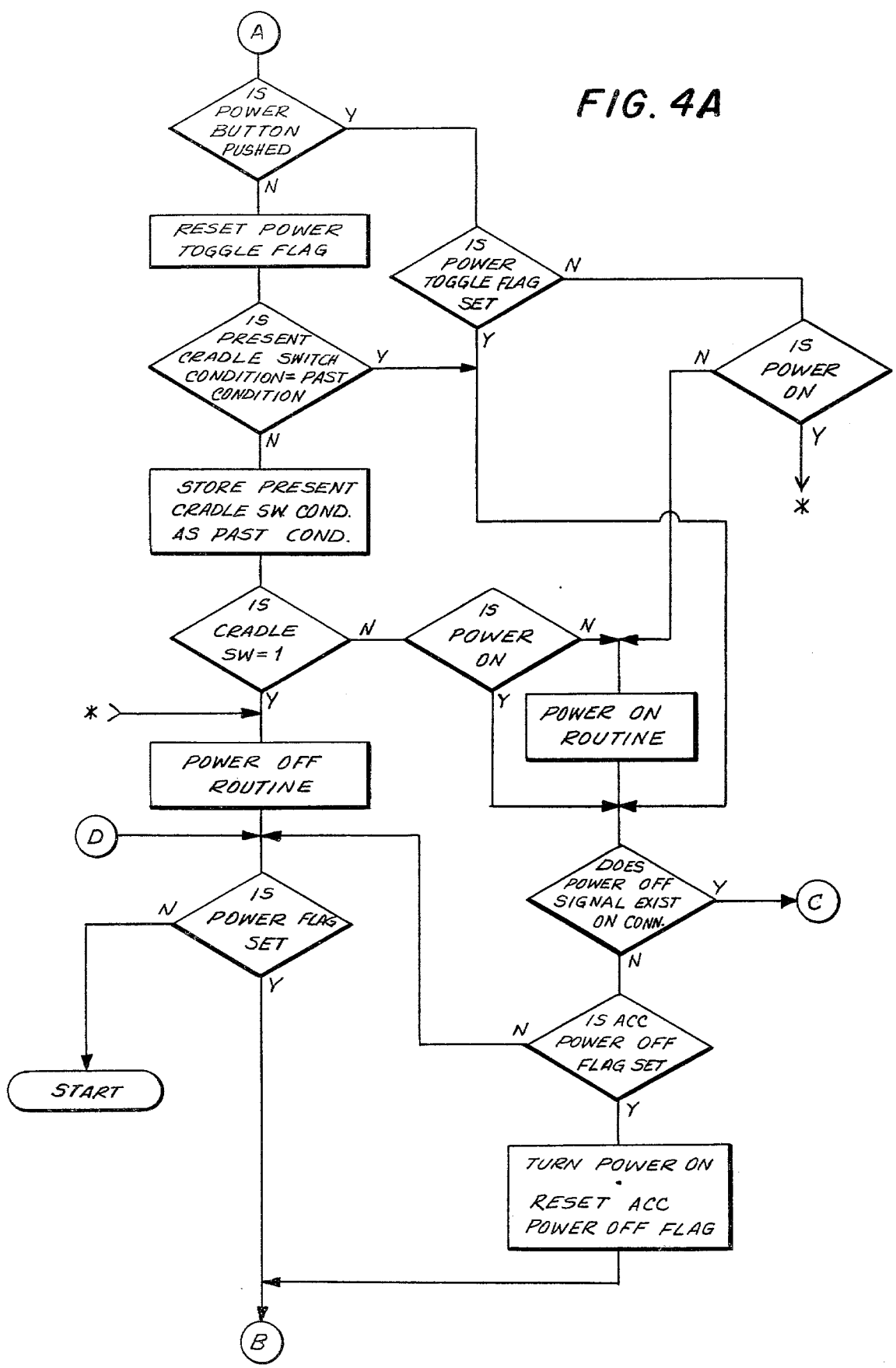
Figure 5A:
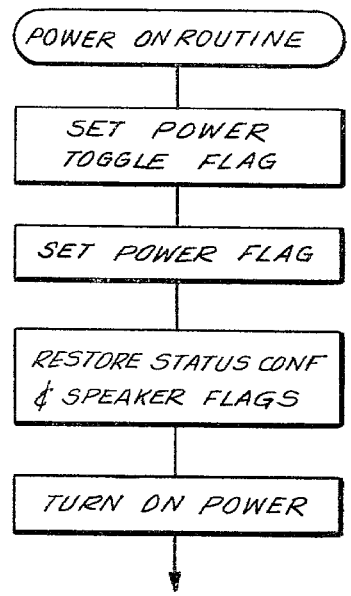
FIGS. 5A and 5B are flow charts illustrating the power-on and power-off subroutines that are performed in the course of the flow chart shown in FIG. 4A.
Figure 5B:
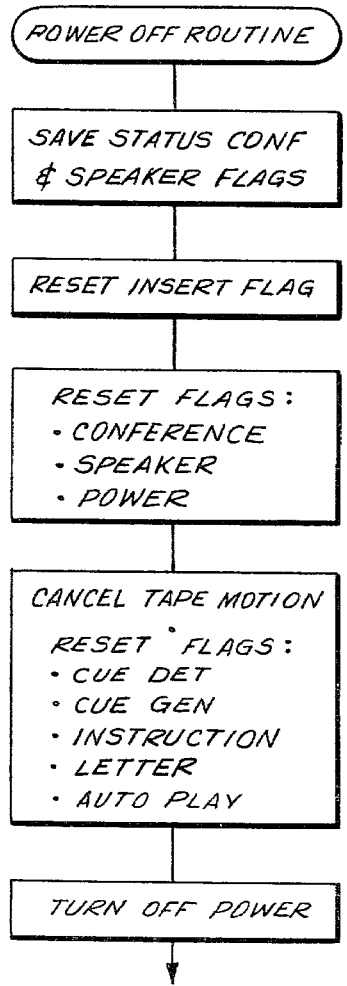

The initial inquiry of the power switch subroutine is, as shown in FIG. 4A, whether POWER switch 42 has been pushed. If so, inquiry next is made as to whether the power toggle flag has been set. The purpose of this power toggle flag signal is similar to that of the telephone toggle flag signal. If the inquiry as to whether the toggle flag signal has been set is answered in the negative, inquiry next is made as to whether power has been turned on, that is, whether the dictation/transcription machine is disposed in its power ON condition. If this inquiry is answered in the affirmative, the power off subroutine, described below with respect to FIG. 5B, is carried out. However, if the dictation/transcription machine is not disposed in its power ON condition, the power on subroutine, discussed below with respect to FIG. 5A, is carried out.

After the power on subroutine is carried out, inquiry is made as to whether a power "off" signal is present at the connector jack of dictation/transcription machine 10. It is recalled that this connector jack may be coupled to microphone unit 12 or to an acccessory unit, such as unit 74. Unit 74 is provided with hook switch 82, which hook switch serves a function analogous to POWER switch 42. More particularly, when handset 78 is received by cradle 80, as when the handset is "hung up", the condition of hook switch 82 is a so-called power "off" condition. It is seen that handset 78 is returned to cradle 80 when operation of dictation/transcription machine 10 is terminated. Since power no longer need be supplied thereto, this condition of hook switch 82 represents a power "off" condition. This condition also results in a power "off" signal supplied to the connector jack of dictation/transcription machine 10. Of course, when handset 78 is removed from cradle 80, the condition of hook switch 82 is such that the power "off" signal is not present. If the power "off" signal is present at the connector jack of the dictation/transcription machine, the power switch subroutine advances to that portion illustrated in FIG. 4B, whereupon inquiry is made as to whether the telephone flag signal has been set. It should be recognized that the power "off" signal may be present at the connector jack of the dictation/transcription machine either when handset 78 is received by cradle 80 of accessory unit 74, or when the telephone adapter (PIA) produces a power "off" signal, as when a telephone call has been completed. Hence, if the power "off" signal is present, and if the telephone flag signal has been set, then it is assumed that this power "off" signal is produced by the telephone adapter. Consequently, power is turned off, that is, the power OFF condition is established; and the status of the power, conference and speaker switches are not stored. However, if the telephone flag had not been set, inquiry is made as to whether an accessory power off flag signal had been set. This accessory power off flag signal is set only if a power OFF condition is to be established in response to, for example, the placing of handset 78 in cradle 80. In accordance with the power off subroutine, if the power "off" signal is present at the connector jack, but the telephone flag is not set, and the accessory power off flag signal is not set, then the programmed microprocessor now sets the accessory power off flag signal. The power OFF condition is established; and, moreover, the status of the power, conference and speaker switches are stored. It may be appreciated that, by storing the status of the conference and speaker switches, the respective conditions associated with these switches and selected by the user are "remembered" for future use. These respective conditions are restored if accessory unit 74 is replaced by microphone unit 12.

After the power OFF condition has been established, the programmed microprocessor continues with the power switch subroutine illustrated in FIG. 4A.

If, in that portion of the power switch subroutine illustrated in FIG. 4B, the inquiry of whether the accessory power off flag signal had been set is answered in the affirmative, thus representing that the power OFF condition already had been established and that the power "off" signal remains at the connector jack, inquiry is made as to whether the cue generate flag signal is set. If not, then the cue toggle flag signal is reset. However, if the cue generate flag signal had been set, then the instruction enable flag signal is set. These steps are described in the cue generate subroutine explained in copending application Ser. No. 178,357. Then, either after the cue toggle flag signal has been reset or after the instruction enable flag signal has been set, the programmed microprocessor advances to the START condition, described generally with respect to FIG. 2 above.

Returning to the flow charts shown in FIG. 4A, if the power "off" signal is not present at the connector jack of dictation/transcription machine 10, then it may be assumed that, if an accessory unit is connected thereto, the power OFF condition should be terminated; or, alternatively, an accessory might not be connected to the dictation/transcription machine. For example, if microphone unit 12 is connected thereto, a power "off" signal cannot be provided from the microphone unit to the connector jack. If the inquiry as to whether the power "off" signal is present at the connector jack is answered in the negative, inquiry next is made as to whether the accessory power off flag signal has been set. As mentioned above with respect to that portion of the flow chart shown in FIG. 4B, the accessory power off flag signal is set only if a power OFF condition is to be established from the accessory unit. That is, if handset 78 is placed in cradle 80, the accessory power off flag signal will be set. Therefore, if the power "off" signal is not present at the connector jack, but if the accessory power off signal had been set, then it is concluded that the power OFF condition had been established from the accessory unit, but that this condition should be terminated. Consequently, power now is turned on; and the accessory power off flag signal is reset. The programmed microprocessor then continues with the toggle switch subroutine illustrated in FIG. 6.

Figure 6:
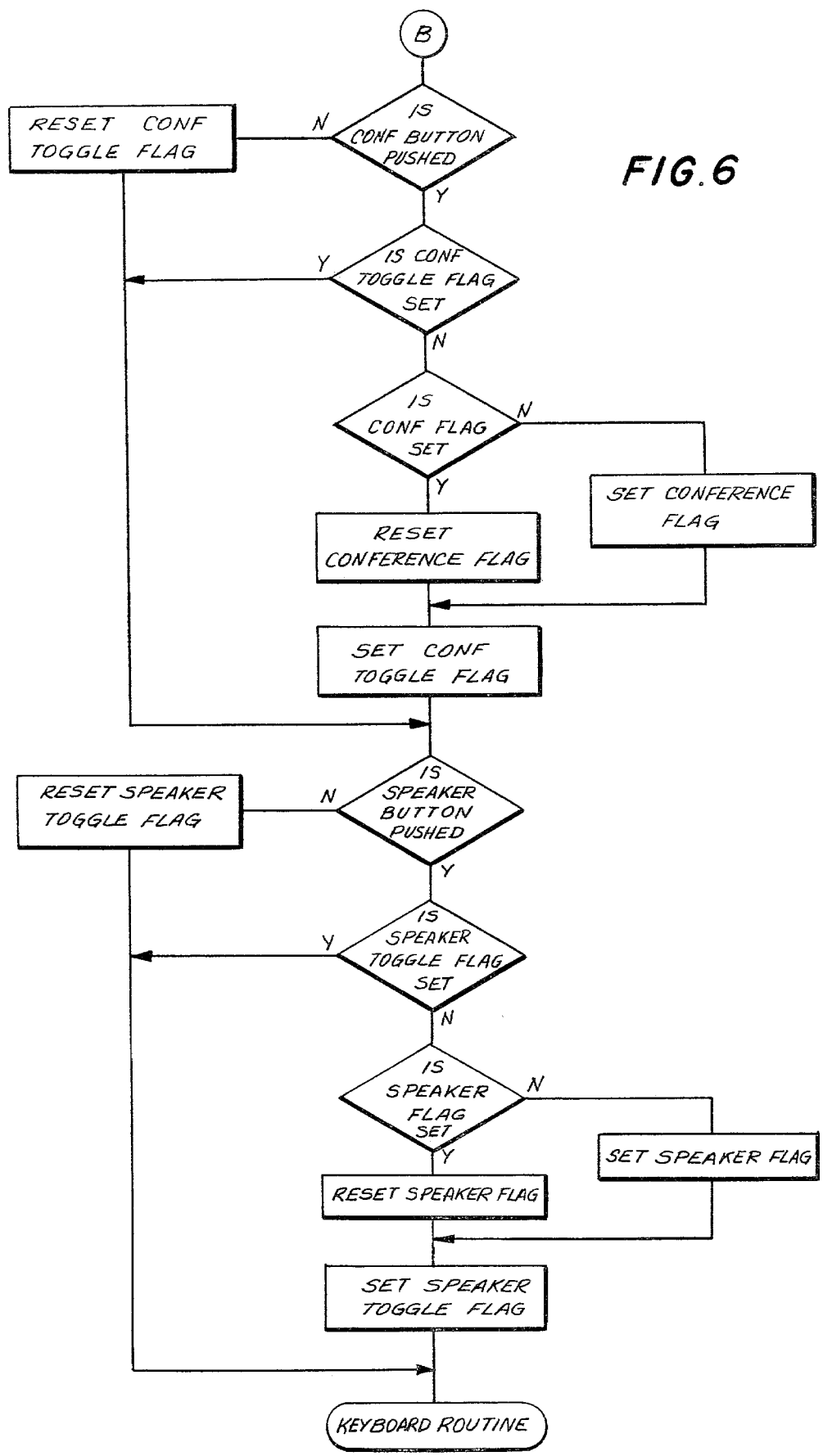
FIG. 6 is a flow chart illustrating the manner in which the microprocessor controls other conditions of the dictation/transcription machine in response to the selective actuation of other control switches thereon.

If, however, the power "off" signal is not present at the connector jack and, moreover, the accessory power off flag signal had not been set, it may be concluded either that microphone unit 12 is connected to dictation/transcription machine 10, or that the power ON condition already has been established. Inquiry then is made as to whether the power flag signal is set. If this inquiry is answered in the affirmative, thus representing that the power ON condition already had been established, the toggle switch routine illustrated in FIG. 6 is carried out. However, if this inquiry is answered in the negative, then it may be assumed that microphone unit 12 is connected to dictation/transcription machine 10: and the microprocessor advances to its START condition, described generally above with respect to FIG. 2, is carried out.

In the flow chart of FIG. 4A thus far described, it has been assumed that the inquiry as to whether the power "off" signal is present at the connector jack is made after the power on subroutine is carried out. If, however, it is determined that POWER switch 42 is pushed, but the inquiry as to whether the power toggle flag signal has been set is answered in the affirmative, then the power on subroutine is bypassed, as shown.

Let it be assumed that the inquiry of whether POWER switch 42 is pushed is answered in the negative. As a result of this answer, the power toggle flag signal is reset. Next, inquiry is made as to whether the present condition of cradle switch 72 is the same as the condition of this switch which was detected during the preceding cycle of the programmed microprocessor. This inquiry is answered in the affirmative only if there has been no change in the condition of cradle switch 72. That is, if microphone unit 12 remains positioned in cradle 70, then there will be no change in the condition of this switch. Conversely, if microphone unit 12 remains out of cradle 70, there will be no change in the condition of switch 72. If this inquiry is answered in the affirmative, the power on routine is bypassed, and inquiry is made as to whether a power "off" signal is present at the connector jack of dictation/transcription machine 10. However, if the present condition of cradle switch 72 differs from the past condition thereof, that is, if microphone unit 12 has been removed from cradle 70 or, conversely, if the microphone unit has been placed upon the cradle, then the present condition of the cradle switch now is stored as the past conition thereof. For example, let it be assumed that, when microphone unit 12 is disposed on cradle 70, the condition of cradle switch 72 may be represented as a binary "1". When the microphone unit is removed from cradle 70, the condition of cradle switch 72 changes, and can be represented as a binary "0". The present condition of this switch, whether it is a binary "0", now is stored as a representation of the past condition. This enables a subsequent comparison with the condition of the cradle switch during the next-following cycle of the programmed microprocessor.

After the present condition of the cradle switch is stored as a representation of the past condition thereof, inquiry is made as to whether this condition is a binary "1". If not, that is, if microphone unit 12 has been removed from cradle 70, inquiry is made as to whether the power ON condition is present. If this condition is not present, the power on routine is carried out. However, if the power ON condition already had been established, the power on routine is bypassed, and inquiry next is made as to whether the power "off" signal is present at the connector jack.

However, if the condition of cradle switch 72 is represented as a binary "1", thus representing that microphone unit 12 has been returned to cradle 70, the power off routine is carried out. Following this power off routine, inquiry is made as to whether the power flag signal has been set. If so, the programmed microprocessor continues with the toggle switch routine illustrated in FIG. 6. However, if the power flag signal had not been set, the microprocessor advances to its START condition.

Before describing the operation of the power switch routine, the power on and power off routines, illustrated in FIGS. 5A and 5B, will be explained. In carrying out the power on routine (FIG. 5A), the power toggle flag signal is set, and then the power flag signal is set. Following the setting of these flags, the status of the conference and speaker switches are restored. That is, if the conference switch had been actuated to select the "conference" mode, increasing the amplification of the signals which are recorded on the magnetic tape, this "conference" mode is restored. Similarly, if SPEAKER switch 48 had been actuated to select the speaker which is integral with dictation/transcription machine 10, then this speaker now is re-selected. In addition, the status of the conference and speaker flag signals are restored. As a result thereof, the conference and speaker indicating lamps are selectively energized to indicate whether the "conference" mode has been selected and to indicate whether the speaker which is integral with the dictation/transcription machine has been selected. Then, after the status of the conference and speaker flag signals are restored, the power ON condition is established.

In carrying out the power off routine (FIG. 5B), the status of the conference and speaker switches are stored. For example, if the "conference" mode had been selected while power was supplied to dictation/transcription machine 10, then a representation of this selection is stored during execution of the power off routine. Similarly, if the speaker which is integral with the dictation/transcription machine had been selected during the power ON condition, then a representation of this selection also is stored. In addition, the status of the conference and speaker flag signals, which represent such selections, are stored.

After storing the status of the conference and speaker flag signals, the insert flag signal is reset. If, during use of machine 10, the "insert" mode had been selected, this insert flag signal would have been set. Now, in carrying out the power off subroutine, it is desired that the insert flag signal be reset such that when the power ON condition is reinstated, the "insert" mode will not be established. This avoids unintentional dictation in the "insert" mode.

After the insert flag signal is reset, the conference, speaker and power flag signals all are reset. It is appreciated that the step of resetting the conference and speaker flag signals is distinct from the step of storing the status of these conference and speaker flag signals. Although the status of these flag signals is stored, once the conference, speaker and power flag signals are reset, the conference, speaker and power indicating lamps all are de-energized. Nevertheless, the resetting of these flag signals does not affect the stored status thereof.

Also, all tape motion is cancelled. Thus, when carrying out the power off subroutine, if tape had been transported, such tape now is stopped. In addition, the cue detect, cue generate, instruction, letter and auto-play flag signals all are reset. This terminates the corresponding operating conditions which may have been established when such flag signals were set. Finally, power is turned off. That is, operating power is terminated so as to establish the power OFF condition.

Returning now to FIGS. 4A and 4B, let it be assumed, initially, that microphone unit 12 is coupled to dictation/transcription machine 10. Let it be further assumed that TELEPHONE switch 44 is not operated, so that, when the programmed microprocessor carries out its respective routines, periodic execution of the toggle switch routine will include the power switch routine. If POWER switch 42 is not operated, the power toggle flag signal is reset (even if this flag signal already had been reset), and inquiry is made as to whether the present condition of cradle switch 72 is equal to the past condition thereof. If microphone unit 12 is supported in cradle 70, then the condition of cradle switch 72 may be assumed to be opened. If the cradle switch had been opened at the last cycle of the microprocessor, then the present condition of the cradle switch is equal to the past condition thereof. This inquiry thus is answered in the affirmative.

Next, inquiry is made as to whether the power "off" signal is present at the connector jack of dictation/transcription machine 10. More accurately, inquiry is made as to whether this signal is supplied to a suitable input, such as an input port of the microprocessor or input electronics associated therewith. It is recalled that, when microphone unit 12 is connected to the dictation/transcription machine, this power "off" signal cannot be produced. This is because the microphone unit is not provided with any switching arrangement that is capable of producing or supplying this signal. Hence, the inquiry as to whether the power "off" signal is present at the connector jack now is answered in the negative. The next-following inquiry as to whether the accessory power off flag signal is set also is answered in the negative. This is because, since the microphone unit is not provided with any switching arrangement (other than cradle switch 72) to establish or terminate the power ON condition, the accessory power off flag signal cannot be set. The next-following inquiry of whether the power flag signal has been set also is answered in the negative; and the microprocessor advances to its START condition, described above (FIG. 2).

The foregoing steps are repeated once each cycle of the programmed microprocessor. Now, however, let it be assumed that microphone unit 12 is removed from cradle 70, thereby closing cradle switch 72. When the power switch subroutine next is executed, the inquiry as to whether the power switch is pushed is answered in the negative, the power toggle flag signal is reset, and the inquiry as to whether the present condition of the cradle switch is equal to the past condition thereof now is answered in the negative. The closing of cradle switch 72 is, for example, represented as a binary "0". This representation of the present condition of the cradle switch now is stored for use in subsequent inquiries of whether the present condition thereof is equal to the past condition. This binary "0" is stored as a representation of the past condition of the cradle switch. Inquiry next is made as to whether this representation of the condition of the cradle switch is a binary "1". This inquiry is answered in the negative and, since the power ON condition had not been established, the power on subroutine, described above with respect to FIG. 5A, is carried out. Consequently, the power toggle flag signal and the power flag signal both are set. The status of the conference and speaker flag signals are restored; and the power ON condition is established.

Next, since the power "off" signal is not present at the connector jack, and since the accessory power off signal has not been set, inquiry is made as to whether the power flag signal has been set. From the power on subroutine shown in FIG. 5A, it is appreciated that this power flag signal is set. Hence, the programmed microprocessor continues with the toggle switch routine shown in FIG. 6.

During the next cycle of the microprocessor through the power switch subroutine, if POWER switch 42 is not operated, the power toggle flag, which had been set during execution of the power on subroutine, now is reset. Assuming that microphone unit 12 has not been returned to cradle 70, the present condition of the cradle switch, i.e., its closed condition, is equal to the past condition thereof. The power switch subroutine thus follows the path which has been described above. It is, therefore, appreciated that, for as long as microphone unit 12 remains out of cradle 70, the power ON condition continues.

The power ON condition may be terminated either by operating POWER switch 42 or by returning microphone unit 12 to cradle 70. Let it be assumed, for the purpose of the present discussion, that POWER switch 42 is operated. Accordingly, when the power switch subroutine next is carried out, the inquiry as to whether POWER switch 42 has been pushed is answered in the affirmative. Since, at this time, the power toggle flag signal has not been set, inquiry is made as to whether the power ON condition is present. This inquiry is answered in the affirmative and, therefore, the power switch subroutine advances to carry out the power off subroutine, described above with respect to FIG. 5B. It is appreciated that, in executing the power off subroutine, the power flag signal is reset, and the power ON condition is terminated. At the completion of the power off subroutine, the inquiry as to whether the power flag signal has been set now is answered in the negative. Consequently, the programmed microprocessor advances to its START condition.

It may be recognized that, now that power has been terminated, microphone unit 12 may be replaced on cradle 70 without disturbing the power OFF condition. Assuming that POWER switch 42 has been released, at the next cycle of the power switch subroutine, inquiry is made as to whether the present condition of cradle switch 72 is equal to the past condition thereof. Now that cradle switch 72 has been opened, this inquiry is answered in the negative. Accordingly, the representation of the present condition of the cradle switch, that is, the binary "1", is stored for use, in subsequent cycles of the power switch subroutine, as a representation of the past condition thereof. Following this step, inquiry as to whether the representation of the condition of cradle switch 72 is a binary "1" is answered in the affirmative. Hence, the power off subroutine which had been executed in response to the operation of POWER switch 42 now is executed once again. Nevertheless, this does not modify the power OFF condition in which dictation/transcription machine 10 presently is disposed. After the power off subroutine is carried out, since the power flag signal is not set, the microprocessor advances to its START condition.

From the foregoing, it is appreciated that, if POWER switch 42 had not been operated, the power ON condition nevertheless can be terminated merely by replacing microphone unit 12 in cradle 70. This procedure opens cradle switch 72, whereupon its condition is represented as a binary "1". Consequently, the power off subroutine is carried out.

In the foregoing discussion, it has been assumed that the power ON condition was established in response to the removal of microphone unit 12 from cradle 70. That is, the closing of cradle switch 72 resulted in establishing the power ON condition. It should be appreciated that, even if microphone unit 12 remains in cradle 70, the power ON condition may be established by operating POWER switch 42. When this power switch is pushed, if the power toggle flag signal has not been set, inquiry is made as to whether the power ON condition is present. If not, the power on subroutine is executed. Once the power ON condition has been established, it may be terminated either by reactuating POWER switch 42 or by opening cradle switch 72, all as described above.

Let it now be assumed that accessory unit 74 is connected to dictation/transcription machine 10. Let it further be assumed that the power OFF condition is present; and that handset 78 is disposed in cradle 80 such that hook switch 82 is in its open condition. For the purpose of the present discussion, it will be assumed that, when hook switch 82 is opened, this condition is represented by the power "off" signal supplied via conductor 88 and plug 90 to the connector jack of the dictation/transcription machine.

When the power switch subroutine now is carried out, if POWER switch 42 is not pushed, the power toggle flag signal is reset. Furthermore, if microphone unit 12 is not coupled to the dictation/transcription machine, it is appreciated that the present condition of the cradle switch is equal to the past condition thereof. Accordingly, inquiry is made as to whether the power "off" signal is present at the connector jack. In the present example, it is assumed that hook switch 82 is opened. Hence, this inquiry is answered in the affirmative.

The power switch subroutine now advances to that portion of the flow chart shown in FIG. 4B. It is assumed that the telephone flag signal has not been set. It is recalled that, if the telephone flag signal is not set, the telephone mode is not established. It is further assumed that the accessory power off flag signal is set. In accordance with the presently assumed arrangement, the accessory power off flag signal is set when handset 78 is returned to cradle 80 so as to open hook switch 82. Since it is assumed that handset 78 has been disposed in cradle 80 for some time, it is appreciated that the accessory power off flag signal already is set. Then, if the cue generate flag signal is not set, the cue toggle flag signal is reset; and the microprocessor advances to the START condition. Alternatively, if the cue generate flag signal is set, the instruction enable flag signal is set and then the START condition is assumed. These steps are described more fully in copending application Ser. No. (185268).

Thus, when the power OFF condition is present, this condition is maintained if handset 78 remains in cradle 80 so as to maintain hook switch 82 in its open condition. That is, the power switch subroutine follows the path illustrated in FIGS. 4A and 4B, wherein the power toggle flag signal is reset if the power switch is not pushed, and then, since the present condition of the cradle switch is equal to the past condition thereof, the inquiry as to whether the power "off" signal is present at the connector jack is answered in the affirmative. Since the telephone flag signal is not set but the accessory power off flag signal is, the steps associated with the cue generate flag signal are followed; and then the microprocessor advances to its START condition. The foregoing is repeated at each cycle of the microprocessor.

The power ON condition may be established either by operating POWER switch 42 or by closing hook switch 82, the latter being achieved by removing handset 78 from cradle 80. If POWER switch 42 is operated, then, at the next execution of the power switch subroutine, the inquiry as to whether this power switch has been pushed is answered in the affirmative. Since the power toggle flag signal is not set, the inquiry as to whether the power ON condition is present is answered in the negative. Accordingly, and as has been described above, the power on subroutine is executed. This establishes the power ON condition. At the completion of the power on subroutine, the inquiry as to whether the power "off" signal is present at the connector jack is answered in the affirmative. This is because, in accordance with the present assumption, handsat 78 remains in cradle 80 to maintain hook switch 82 in its open condition. Consequently, the power switch subroutine advances to that portion of the flow chart shown in FIG. 4B. The telephone flag signal still is assumed to be not set, and the accessory power off flag signal still is assumed to be set. Thus, there is no change in the power ON condition which has been established by operating POWER switch 42.

Once the power ON condition has been established by operating POWER switch 42, this condition may be terminated by reactuating the power switch. Thus, when POWER switch 42 is pushed, inquiry as to whether the power ON condition is present is answered in the affirmative. Accordingly, the power off subroutine is carried out, whereupon the power flag signal is reset. Following the power off subroutine, the inquiry as to whether the power flag signal is set is answered in the negative; and the microprocessor advances to its START condition.

Thus, it is seen that, if accessory unit 74 is connected to dictation/transcription machine 10, the power ON condition may be established and terminated merely by operating POWER switch 42. If handset 78 remains in cradle 80 so as to maintain hook switch 82 in its opened condition, the power ON condition is not affected.

Let it be assumed that, in the presence of the power OFF condition, handset 78 is removed from cradle 80 so as to close hook switch 82. Returning to the flow charts shown in FIGS. 4A and 4B, the next time that the power switch subroutine is carried out, the inquiry as to whether the power switch is pushed is answered in the negative. This resets the power toggle flag signal. Then, the inquiry as to whether the present condition of the cradle switch is equal to the past condition thereof is answered in the affirmative.

Now, since hook switch 82 is closed, the inquiry as to whether the power "off" signal is present at the connector jack is answered in the negative. However, the accessory power off flag signal which had been set at a prior time when handset 78 had been placed on cradle 80 to open hook switch 82, remains set. Therefore, the inquiry as to whether this accessory power flag signal is set is answered in the affirmative. Consequently, and as shown in FIG. 4A, the power ON condition is established; and the accessory power off flag signal now is reset. The programmed microprocessor then continues with the toggle switch routine illustrated in FIG. 6.

The power ON condition which is established by closing hook switch 82 may be terminated either by operating POWER switch 42 or by returning handset 78 to cradle 80 so as to open the hook switch. If POWER switch 42 is operated, then, during the next cycle of the microprocessor through the power switch subroutine, the inquiry as to whether the power switch is pushed is answered in the affirmative. Since the power toggle flag signal is not set, the inquiry as to whether the power ON condition is present is answered in the affirmative. Accordingly, the power off subroutine is executed, thereby resetting the power flag signal and terminating the power ON condition. At the completion of the power off subroutine, the inquiry as to whether the power flag signal is set is answered in the negative; and the microprocessor advances to its START condition (FIG. 2).

The power OFF condition is not affected if handset 78 remains out of cradle 80. As shown in FIG. 4A, during a subsequent cycle of the microprocessor through the power switch subroutine, the inquiry as to whether the power switch is pushed is answered in the negative, thereby resetting the power toggle flag signal. The next-following inquiry of whether the present condition of the cradle switch is equal to the past condition thereof is answered in the affirmative. Then, since hook switch 82 remains closed, the inquiry as to whether the power "off" signal is present at the connector jack is answered in the negative. Since the accessory power off flag signal had been reset when handset 78 had been removed from cradle 80 to establish the power ON condition, the next-following inquiry as to whether the accessory power off flag signal is set is answered in the negative. Then, since the power flag signal is not set, the microprocessor advances to its START condition. Thus, it is seen that the power OFF condition, which had been established by the operation of POWER switch 42, is not affected while handset 78 remains out of cradle 80.

Let it now be assumed that, even though the power OFF condition has been established, handset 78 is returned to cradle 80 so as to open hook switch 82. During the next cycle of the microprocessor through the power switch subroutine, the inquiry as to whether the power switch is pushed is answered in the negative. Thus, the power toggle flag signal is reset and the inquiry of whether the present condition of the cradle switch is equal to the past condition thereof is answered in the affirmative. Now, since hook switch 82 is opened, the power "off" signal is present on the connector jack. Accordingly, the power switch subroutine advances to the flow chart shown in FIG. 4B. Assuming that the telephone flag signal is not set, the inquiry of whether the accessory power off flag signal is set is answered in the negative. It is recalled that, when the power ON condition had been established by the closing off hook switch 82, the accessory power off flag signal had been reset. Now, with the opening of hook switch 82, since the accessory power off flag is not set, the power switch subroutine functions to set it. Then, power is turned off. Of course, since the power OFF condition already is present, this step of turning off the power merely is superfluous. That is, the power off condition is maintained. The microprocessor then continues with the toggle switch routine, in accordance with the flow chart shown in FIG. 6.

Let it now be assumed that the power ON condition is present, and this condition had been established by the closing of hook switch 82. When handset 78 is replaced in cradle 80 so as to open the hook switch, the next cycle of the microprocessor through the power switch subroutine is as follows: The inquiry of whether the power switch is pushed is answered in the negative. Thus, the power toggle flag signal is reset and the inquiry of whether the present condition of the cradle switch is equal to the past condition thereof is answered in the affirmative.

Now that hook switch 82 is opened, the power "off"'signal is present at the connector jack. Hence, the power switch subroutine advances to the flow chart shown in FIG. 4B. The inquiry as to whether the telephone flag signal is set is answered in the negative. The next-following inquiry as to whether the accessory power off flag signal is set is answered in the negative. It is recalled that, when the power ON condition had been established in response to the closing of hook switch 82, the accessory power off flag signal had been reset. Now, when hook switch 82 is opened, the accessory power off flag signal is set. Then, the power ON condition is terminated; and the status of the power, conference and speaker switches are saved. Thus, the power OFF condition is established. The microprocessor then proceeds to that portion of the flow chart shown in FIG. 4A wherein inquiry is made as to whether the power flag signal is set. This inquiry is answered in the negative, and the microprocessor advances to its START condition.

From the foregoing description, it is seen that the power ON condition may be established either by operating POWER switch 42 or by removing handset 78 from cradle 80 so as to close hook switch 82. Once the power ON condition has been established, it may be terminated either by operating POWER switch 42 or by returning the handset to cradle 80 so as to open hook switch 82. The action by which the power ON condition is terminated is not dependent upon the manner in which that condition had been established. That is, if the power ON condition had been established by way of operating POWER switch 42, it may be terminated by opening hook switch 82; and if this condition had been established by closing hook switch 82, it may be terminated by operating POWER switch 42.

In the foregoing description, it has been assumed that accessory unit 74 is connected to dictation/transcription machine 10. It should be appreciated that, if desired, other accessory units having switching elements similar to hook switch 82 may be used. The effect of such other accessory devices upon the power On and power OFF conditions will be similar to that mentioned above. Furthermore, if a telephone adapter (PIA) is coupled to the dictation/transcription machine, it will control the power condition in a manner similar to that controlled by accessory device 74. That is, when power is to be terminated, as when a telephone call is completed, the telephone adapter supplies the power "off" signal to the connector jack of the dictation/transcription machine. Conversely, when power is to be supplied, as when an incoming telephone call is detected, the power "off"signal is not provided.

It is appreciated that, when the telephone adapter (PIA) is connected to dictation/transcription machine 10, the power "off" signal is provided at the connector jack when the machine is disposed in its telephone mode. As was described previously with respect to the flow chart shown in FIG. 3, when the telephone mode is established, the telephone flag signal is set. From FIGS. 4A and 4B, it is recognized that, if the power "off" signal is present at the connector jack, and if the telephone flag signal is set, that is, if the dictation/transcription machine is disposed in its telephone mode, then the power OFF condition is established. Thus, power is terminated. Furthermore, since the dictation/transcription machine is disposed in its telephone mode, there is no need to save the status of the power, conference and speaker switches. Thus, when power is terminated in response to the power "off" signal produced by the telephone adapter (PIA), the status of these switches is not stored.

It is seen, from FIGS. 4A and 4B, after the power ON condition is established, and after the power switch subroutine is executed by the microprocessor, the programmed routine continues with the toggle switch routine illustrated in FIG. 6. The continuation of this toggle switch routine now will be described.

That portion of the toggle switch routine which is illustrated in FIG. 6 is referred to herein as the conference switch subroutine and the speaker switch subroutine. These subroutines are bypassed if the power OFF condition is present. Thus, if the power flag signal is not set or if the accessory power off flag signal is set, the conference and speaker switch subroutines are not executed. For the purpose of the present discussion, let it be assumed that the power ON condition is present. Thus, during each cycle of the microprocessor through the toggle switch routine, the conference and speaker switch subroutines, as represented in FIG. 6, will be executed. The initial inquiry is whether CONFERENCE switch 46 has been pushed. If not, the conference toggle flag signal is reset; and the programmed routine advances to inquire whether SPEAKER switch 48 has been pushed. If the speaker switch has not been pushed, the speaker toggle flag signal is reset; and the microprocessor advances to carry out the keyboard switch routine. Thus, the status of the conference and speaker switches, that is, the selection of the "conference" mode and the selection of the particular speaker which is to be used to transduce the reproduced signals, are not altered.

Let it be assumed that CONFERENCE switch 46 now is operated. Hence, during the next cycle of the microprocessor through the toggle switch routine, inquiry of whether CONFERENCE switch 46 is pushed is answered in the affirmative. If the conference toggle flag signal is not set, inquiry is made as to whether the conference flag signal is set. It should be appreciated that this flag signal is set if the "conference" mode is selected, with accompanying increased amplification of signals to be recorded; and the conference flag signal is not set if relatively lower amplification is desired. If the conference flag signal is not set, then the conference switch subroutine sets this flag signal. Conversely, if the conference flag signal is set, then the conference switch subroutine resets this flag signal. Then, the conference toggle flag signal is set, and the microprocessor advances to execute the speaker switch subroutine.

The speaker switch subroutine is similar to the aforedescribed conference switch subroutine and if it is sensed that SPEAKER switch 48 is pushed, inquiry is made as to whether the speaker toggle flag signal is set. If this toggle flag signal is not set, inquiry next is made whether the speaker flag signal is set. This flag signal is set if the speaker which is integral with dictation/transcription machine 10 is selected. However, if the speaker which is provided in microphone unit 12 is selected, then the speaker flag signal is not set. If the speaker flag signal had not been set, then the operation of the speaker switch results in setting this signal. Conversely, if the speaker flag signal had been set, then it is reset in response to the operation of the speaker switch. Then, the speaker toggle flag signal is set; and the microprocessor advances to carry out the keyboard switch routine.

It may be appreciated that the purpose of the conference and speaker toggle flag signals is to avoid unnecessary steps while the conference and speaker switches, respectively, are operated. For example, once the conference toggle flag signal has been set, if it is sensed that the conferences switch still is being pushed, the steps of setting or resetting the conference flag signal are avoided. Thus, once the conference flag signal is set in response to the operation of the conference switch, it remains set. If the conference toggle flag signal had not been set, then, at each cycle of the microprocessor, the conference flag signal first would be set and then reset and then set again. This alternating operation is avoided by setting the conference toggle flag signal. Similarly, if the speaker toggle flag is set in response to the operation of the speaker switch, then alternately setting and resetting the speaker flag signal at each cycle of the microprocessor is avoided.

It is appreciated, from the foregoing description of the telephone and power switch subroutines, that, when the telephone mode is established, or the power OFF condition is established, the status of the conference and speaker flag signals are stored. This enables the previous selection of the "conference" mode and the previous selection of the appropriate speaker to be reinstated when the telephone mode is terminated or when the power ON condition next is established.

While the present invention has been particularly shown and described with reference to preferred embodiments thereof, it should be readily apparent to those of ordinary skill in the art that various changes and modifications in form and details may be made without departing from the spirit and scope of the invention. In its broader aspects, the present invention controls the operating conditions of a device, not necessarily a dictation/transcription machine. It is seen that, by utilizing a microprocessor, or its equivalent, to establish machine conditions in response to the operation of different selector switches, the operation of the device may be controlled by various units that are interchangeably useful therewith. In the examples described above, dictation/transcription machine 10 can be used with a microphone unit 12, an accessory unit 74 or a telephone adapter (PIA), all of which serve to control different machine conditions, such as the power ON/OFF condition. It is intended that the appended claims be interpreted as including those changes and modifications which one of ordinary skill in the art may make to the broader aspects of this invention, as well as to the particular embodiments which have been described herein.

What is claimed is:

1. A method of controlling a predetermined condition of a dictate and/or transcribe machine by a processor programmed to cycle through a set of instructions, said predetermined condition being selectable by a plurality of switch means, said processor carrying out the steps of (a) sensing if a first of said switch means is actuated; (b) if said first switch means is actuated, sensing if said dictate and/or transcribe machine exhibits said predetermined condition, and (i) if so, terminating said predetermined condition, (ii) if not, disposing said dictate and/or transcribe machine in said predetermined condition; (c) if said first switch means is not actuated, sensing if a second of said switch means is actuated; (d) disposing said dictate and/or transcribe machine in said predetermined condition if said second switch is actuated; (e)

sensing when said second switch means subsequently is deactuated; (f) terminating said predetermined condition when said second switch means subsequently is deactuated; (g) setting a flag signal when said first or second switch means is actuated to dispose said dictate and/or transcribe machine in said predetermined condition; (h) resetting said flag signal when said first switch means is re-actuated; (i) resetting said flag signal when said second switch means is deactuated, whereby said dictate and/or transcribe machine exhibits said predetermined condition only when said flag signal is set; and (j) cyclically repeating steps (a) through (i).

2. The method of claim 1 wherein said predetermined machine condition is a power ON condition, and wherein said flag signal is a power flag signal.

3. The method of claim 2, further comprising the steps of sensing the absence of a change of state of said second switch means; and, in the absence of a change of state of said second switch means, sensing if a third of said switch means is in a condition which demands that power be supplied to said machine and, if so, setting said power flag signal.

4. In a dictate and/or transcribe machine having at least a first touch-sensitive switch which, when touched, selectively supplies and terminates operating power to said dictate and/or transcribe machine, and a second switch which, when disposed in a first condition supplies said operating power to said dictate and/or transcribe machine and when disposed in a second condition terminates said operating power, the improvement comprising a processor included in said dictate and/or transcribe machine programmed to cycle through a set of instructions for controlling the operating condition of said dictate and/or transcribe machine, said processor instructions including a power subroutine comprising the steps of (a) sensing if said touch-sensitive switch is being touched; (b) if said touch-sensitive switch is being touched, sensing if power is being supplied to said dictate and/or transcribe machine and (i) if so, terminating said power, (ii) if not, supplying said power; (c) if said touch-sensitive switch is not being touched, sensing the condition of said second switch; (d) supplying power to said dictate and/or transcribe machine if said second switch is disposed in said first condition, (e) terminating power to said dictate and/or transcribe machine if said second switch is disposed in said second condition; and (f) cyclically repeating steps (a) through (e), whereby power is selectively supplied to said dictate and/or transcribe machine, under the control of said processor, in response to the touching of said touch-sensitive switch or in response to the condition of said second switch.

5. The invention of claim 4 wherein said second switch comprises a cradle switch; and further comprising a cradle for receiving a microphone unit; said cradle switch being disposed in said first condition when said microphone unit is not in said cradle and said cradle switch being disposed in said second condition when said microphone unit is received by said cradle.

6. The invention of claim 5 wherein said dictate and/or transcribe machine includes input connecting means for connecting accessory sound transmitting means to said dictate and/or transcribe machine to enable the recording of sound signals, said input connecting means being responsive to selective operation of said sound transmitting means to provide a power off signal representing that power should not be supplied to said machine; and wherein said power subroutine further comprises the steps of sensing if said power off signal is provided and (i) if so, terminating said power, (ii), if not, selectively supplying said power.

7. The invention of claim 6 wherein said power subroutine further comprises the steps of setting an accessory power off flag signal if said power off signal is sensed; maintaining said accessory power off flag signal so long as power is not supplied; sensing the termination of said power off signal; supplying said power when said power off signal terminates and said accessory power off flag signal is set; and resetting said accessory power off flag signal.

8. The invention of claim 7 wherein said step of terminating said power if said power off signal is sensed is inhibited if said accessory power off flag signal is set.

9. The invention of claim 8 wherein said step of supplying power if said power off signal is not sensed is inhibited if said accessory power off flag signal is not set.

10. Apparatus for selectively establishing the power ON condition of a dictation/transcription machine, comprising first selectively actuable switch means; second switch means having a first state representing that said power ON condition should be established and a second state representing that said power ON condition should be terminated; first switch sensing means for sensing the actuation of said first switch means; second switch sensing means for sensing the state of said second switch means; condition detecting means for detecting the power ON condition of said dictation/transcription machine; means for selectively establishing said power ON condition in response to the actuation of said first switch means or in response to the changing over of said second switch means from said second state thereof to said first state, if said dictation/transcription machine does not exhibit said power ON condition; and means for selectively terminating said power ON condition in response to the actuation of said first switch means or in response to the changing over of said second switch means from said first state thereof to said second state, if said dictation/transcription machine exhibits said power ON condition, whereby said power ON condition is selectively established in response to the actuation of said first switch means or in response to the state of said second switch means.

11. The apparatus of claim 10 wherein said first switch means comprises a touch-sensitive switch.

12. The apparatus of claim 11 wherein said second switch means is operative to said first state when information is to be recorded on said dictation/transcription machine.

13. The apparatus of claim 12 wherein said dictation/transcription machine includes a microphone cradle for receiving a microphone unit; and said second switch means comprises a cradle switch disposed in said first state when a microphone unit is removed from said cradle and disposed in said second state when a microphone unit is placed in said cradle.

14. The apparatus of claim 12 wherein said dictation/transcription machine includes an accessory input connection for coupling to an accessory device so as to receive said information for recording; and said second switch means comprises a switch on said accessory device to supply a power off signal to said input connection when said last-mentioned switch is in said second state and to remove said power off signal when said last-mentioned switch is in said first state.

15. The apparatus of claim 14 wherein said second switch sensing means senses the presence or absence of said power off signal; and wherein said means for selectively terminating said predetermined operating condition includes flag generating means for setting an accessory power off flag signal when said power off signal is initiated while said power ON condition is present; and wherein said means for selectively establishing said predetermined operating condition includes flag sensing means for sensing said accessory power off flag signal in the absence of said power off signal, power turn on means for establishing said power ON condition if said accessory power off flag signal is set, and flag reset means for resetting said accessory power off flag signal when said power ON condition is established in response to the sensing of said accessory power off flag signal.

16. The apparatus of claim 15 wherein said dictation/transcription machine includes a microphone cradle for receiving a microphone unit; and further comprising a cradle switch disposed in a first condition when a microphone unit is removed from said cradle and disposed in a second condition when a microphone unit is placed in said cradle, said power turn on means being responsive to the change over of said cradle switch from said second condition to said first condition to establish said power ON condition if said power ON condition had not been present; and power turn off means selectively responsive to the change over of said cradle switch from said first condition to said second condition, or to the touching of said touch-sensitive switch while said power ON condition is present, or to the sensed presence of said power off signal while said accessory power off flag signal is reset, for terminating said power ON condition.

17. A method of controlling the operating condition of a dictate/transcribe machine having a plurality of independently actuable selector switches, each selector switch being associated with a respective condition of said machine and being actuable to establish or terminate its associated condition, and indicator means associated with respective ones of said selector switches for indicating the status of the corresponding conditions; the improvement wherein said method is carried out by a processor programmed to perform the steps of sensing if a predetermined one of said selector switches is actuated; establishing in response to the actuation of said predetermined selector switch a predetermined operating condition for said dictate/transcribe machine associated with said predetermined selector switch if said predetermined condition is not then present while storing the status of the respective conditions associated with the remaining ones of said selector switches, said predetermined condition overriding said respective conditions; energizing said indicator means to provide predetermined indications when said predetermined selector switch is actuated, notwithstanding the actual status of said corresponding conditions; and terminating said predetermined condition in response to the actuation of said predetermined selector switch if said predetermined condition is then present and restoring said respective conditions associated with said remaining ones of said selector switches in accordance with the stored status thereof.

18. The method of claim 17 wherein said step of sensing if said predetermined switch is actuated comprises incrementing a counter periodically in response to and for as long as said predetermined switch is actuated; resetting said counter to an initial count in response to the deactuation of said predetermined switch; and determining that said predetermined switch is actuated when said counter attains a threshold count.

19. In a voice recorder connectable to a microphone or to telephone apparatus to receive and record voice signals, and having a plurality of selector switches each actuable to establish respective operating conditions and a telephone selector switch actuable to establish a telephone mode to enable the recording of voice signals received from said telephone apparatus, the telephone mode overriding the established operating conditions, a processor programmed to cycle through a set of instructions for controlling the operation of said recorder, said instructions including a telephone mode subroutine comprising the steps of (a) sensing if said telephone selector switch is actuated; (b) if said telephone selector switch is actuated, sensing if said recorder is disposed in said telephone mode; (c) if said recorder is not disposed in said telephone mode, (i) storing the status of the operating conditions which had been established by said plurality of selector switches and (ii) establishing said telephone mode; (d) if said recorder is disposed in said telephone mode, (i) terminating said telephone mode and (ii) restoring the operating conditions which had been established by said plurality of selector switches in accordance with said stored status; and (e) cyclically repeating steps (a) through (d).

20. The invention of claim 19 wherein said step of sensing if said telephone selector switch is actuated comprises incrementing a counter by one count each time said processor cycles through said set of instructions so long as said telephone selector switch is operated; resetting said counter to an initial count when said telephone selector switch is released; and detecting when said counter attains a predetermined count, thereby representing that said telephone selector switch has been actuated.

21. The invention of claim 19 wherein one of said plurality of selector switches is a power on/off switch for selectively supplying and terminating power to said recorder; and wherein said step of establishing said telephone mode includes simulating the operation of said power switch to supply power to said recorder notwithstanding the actual operating condition of said power switch.

22. The invention of claim 21 wherein said step of restoring the operating conditions which had been established by said plurality of selector switches includes supplying or terminating power to said recorder in accordance with the actual operating condition of said power switch.

23. The invention of claim 19 wherein said recorder includes a plurality of indicators, selectively energizable to indicate the respective operating conditions established by each of said selector switches; and wherein said telephone subroutine further includes the step of energizing said indicators when said recorder is disposed in said telephone mode regardless of the actual operating conditions which have been established.

24. Apparatus for selectively controlling the operating condition of a dictation machine, comprising a plurality of independently actuable selector switches, each switch being actuable to establish or terminate, selectively, a respective operating condition of said dictation machine and to produce a signal when actuated, the same signal being produced thereby regardless of whether the respective operating condition is established or terminated; switch sensing means for sensing the actuation of a predetermined one of said switches; condition detecting means for detecting whether or not said dictation machine is disposed in the predetermined condition associated with said predetermined switch; means for establishing said predetermined condition in response to the actuation of said predetermined switch if said dictation machine is not then disposed in said predetermined condition; storage means for storing the status of the respective operating conditions of said dictation machine as determined by the selective actuation of the remainder of said selector switches, whereby said predetermined condition overrides those operating conditions not compatible therewith; means for terminating said predetermined condition in response to the actuation of said predetermined switch if said dictation machine is then disposed in said predetermined condition; and read-out means for reading out the stored status of the respective operating conditions of said dictation machine to restore said dictation machine to those operating conditions which were present at the time said predetermined condition was established.

25. The apparatus of claim 24 wherein each of said selector switches is a touch-sensitive switch.

26. The apparatus of claim 24 wherein said predetermined switch is a manually operable telephone switch for selectively establishing or terminating a telephone mode of operation, and wherein said dictation machine is operative to record dictated information transmitted via a telephone communication channel when said telephone mode is established.

27. The apparatus of claim 26 further comprising means for setting a telephone flag signal when said telephone mode is established and for resetting said telephone flag signal when said telephone mode is terminated; and wherein said condition detecting means comprises means for sensing if said telephone flag signal is set or reset.

28. The apparatus of claim 27 wherein said means for establishing said predetermined condition comprises counter means whose count is periodically changed until a predetermined limit count is attained; means for periodically changing the count of said counter means while said telephone switch is manually operated, if said telephone flag signal is reset; means for resetting said counter means to an initial count when said telephone switch is released; and means responsive to said predetermined limit count of said counter means to cause said telephone flag signal to be set.

29. The apparatus of claim 28 wherein said means for terminating said predetermined condition comprises means responsive to the manual operation of said telephone switch and the concurrence of said telephone flag signal to cause said telephone flag signal to be reset.

30. The apparatus of claim 29 wherein at least one of the remainder of said selector switches is a manually operable power switch for selectively supplying or terminating operating power to said dictation machine; and further comprising means for sensing that operating power is not supplied to said dictation machine; and means responsive to said predetermined limit count to cause said operating power to be supplied to said dictation machine if said last-mentioned sensing means senses that operating power is not being supplied thereto.

* * * * *